US010567448B2

(12) United States Patent
Bader-Natal et al.

(10) Patent No.: US 10,567,448 B2
(45) Date of Patent: *Feb. 18, 2020

(54) PARTICIPATION QUEUE SYSTEM AND METHOD FOR ONLINE VIDEO CONFERENCING

(71) Applicant: Minerva Project, Inc., San Francisco, CA (US)

(72) Inventors: Ari Bader-Natal, Pacifica, CA (US); Brian Fields, San Francisco, CA (US); Matthew Michael Regan, Seattle, WA (US); Jonathan Scott Katzman, San Francisco, CA (US); Stephen Kosslyn, San Francisco, CA (US); Brandon Tilley, San Francisco, CA (US); Gene Hallman, San Francisco, CA (US)

(73) Assignee: Minerva Project, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/943,313

(22) Filed: Apr. 2, 2018

(65) Prior Publication Data
US 2018/0227337 A1 Aug. 9, 2018

Related U.S. Application Data

(63) Continuation of application No. 15/376,506, filed on Dec. 12, 2016, now Pat. No. 9,935,987, which is a
(Continued)

(51) Int. Cl.
*H04L 29/06* (2006.01)
*H04N 7/15* (2006.01)
(Continued)

(52) U.S. Cl.
CPC ...... *H04L 65/1096* (2013.01); *H04L 12/1813* (2013.01); *H04L 12/1822* (2013.01);
(Continued)

(58) Field of Classification Search
CPC combination set(s) only.
See application file for complete search history.

(56) References Cited

U.S. PATENT DOCUMENTS 7,007,235 B1 2/2006 Hussein et al.
8,928,727 B1 * 1/2015 Milligan ............... H04N 7/147
348/14.08
(Continued)

OTHER PUBLICATIONS

Abandonment from U.S. Appl. No. 14/675,712, dated Jun. 16, 2016, 1 page.
(Continued)

*Primary Examiner* — Phung-Hoang J Nguyen
(74) *Attorney, Agent, or Firm* — Nicholson De Vos Webster & Elliott LLP

(57) ABSTRACT

A virtual conferencing system is described for implementing a speaker queue. For example, one embodiment of the virtual conferencing system comprises: a plurality of clients, each of the clients comprising state management logic to maintain a current state of a virtual conference; a virtual conferencing service to establish audio and/or video connections between the plurality of clients during the virtual conference, the virtual conferencing service further including a state synchronization service communicatively coupled to the state management logic on each client to ensure that the current state of the virtual conference is consistent on each client; wherein the current state on each client includes a speaker queue comprising an ordered set of participants to be designated as current speakers during the virtual conference, wherein participants are added to the speaker queue in response to input provided by the partici-
(Continued)

pants indicating a desire to be a current speaker, wherein one or more participants towards the top of the speaker queue are designated to be current speakers, wherein participants are initially added to the bottom of the speaker queue and are moved towards the top of the speaker queue as other participants are removed from the top of the speaker queue; a virtual conferencing graphical user interface (GUI) to display a video stream of one or more current speakers within one or more current speaker regions, the virtual conferencing GUI further providing a visual representation of the speaker queue to each of the participants, the visual representation comprising an ordered representation of each of the participants in the speaker queue.

22 Claims, 24 Drawing Sheets

Related U.S. Application Data continuation of application No. 14/675,708, filed on Mar. 31, 2015, now Pat. No. 9,521,170.

(60) Provisional application No. 61/982,805, filed on Apr. 22, 2014, provisional application No. 61/982,807, filed on Apr. 22, 2014.

(51) Int. Cl.
  *H04N 7/14* (2006.01)
  *H04L 12/18* (2006.01)

(52) U.S. Cl.
  CPC ...... *H04L 65/1069* (2013.01); *H04L 65/1093* (2013.01); *H04L 65/403* (2013.01); *H04N 7/147* (2013.01); *H04N 7/15* (2013.01); *H04N 7/157* (2013.01); *H04L 12/1827* (2013.01)

(56) References Cited

U.S. PATENT DOCUMENTS

| | | |
|---|---|---|
| 2004/0044556 A1 | 3/2004 | Brady et al. |
| 2004/0107251 A1 | 6/2004 | Wat et al. |
| 2004/0161728 A1 | 8/2004 | Benevento et al. |
| 2005/0032539 A1 | 2/2005 | Noel et al. |
| 2005/0243166 A1* | 11/2005 | Cutler .................... H04N 7/147 348/14.12 |
| 2007/0188597 A1 | 8/2007 | Kenoyer |
| 2007/0263821 A1 | 11/2007 | Shaffer et al. |
| 2007/0263824 A1 | 11/2007 | Bangalore et al. |
| 2011/0093273 A1* | 4/2011 | Lee .......................... G10L 15/24 704/270 |
| 2011/0196928 A1 | 8/2011 | Pryhuber |
| 2011/0316965 A1* | 12/2011 | Moore ................ H04L 12/1827 348/14.09 |
| 2012/0066697 A1 | 3/2012 | Dempski et al. |
| 2012/0182384 A1 | 7/2012 | Anderson et al. |
| 2012/0204118 A1 | 8/2012 | Lefar et al. |
| 2012/0229446 A1 | 9/2012 | Hyndman et al. |
| 2012/0246295 A1 | 9/2012 | Gonzalez-Banos et al. |
| 2013/0018960 A1* | 1/2013 | Knysz ..................... G06Q 50/01 709/204 |
| 2013/0076853 A1 | 3/2013 | Diao |
| 2013/0176250 A1 | 7/2013 | Lee et al. |
| 2014/0028784 A1* | 1/2014 | Deyerle ................... H04N 7/15 348/14.08 |
| 2014/0047027 A1* | 2/2014 | Moyers ................... H04L 51/04 709/204 |
| 2014/0085404 A1 | 3/2014 | Kleinsteiber et al. |
| 2014/0104366 A1 | 4/2014 | Calman et al. |
| 2014/0104392 A1 | 4/2014 | Thörn et al. |
| 2014/0168056 A1 | 6/2014 | Swaminathan et al. |
| 2014/0267550 A1 | 9/2014 | Nimri et al. |
| 2014/0307042 A1* | 10/2014 | Heatley ................. H04L 65/605 348/14.08 |
| 2014/0362165 A1 | 12/2014 | Ackerman et al. |
| 2015/0019624 A1 | 1/2015 | Jayakeerthy et al. |
| 2015/0180748 A1* | 6/2015 | Ding ..................... H04L 41/046 709/224 |
| 2015/0201161 A1* | 7/2015 | Lachapelle ............... H04N 7/15 348/14.07 |
| 2015/0304369 A1* | 10/2015 | Sandholm .............. G06Q 10/10 715/753 |

OTHER PUBLICATIONS

Extended European Search Report for Application No. 15783535.6, dated Nov. 22, 2017, 8 pages.
Final Office Action from U.S. Appl. No. 14/481,854, dated Dec. 20, 2017, 19 pages.
Final Office Action from U.S. Appl. No. 14/481,854, dated Mar. 1, 2017, 19 pages.
Final Office Action from U.S. Appl. No. 15/376,506, dated Sep. 20, 2017, 7 pages.
International Preliminary Report on Patentability for Application No. PCT/US15/26885, dated Oct. 25, 2016, 7 pages.
International Search Report and Written Opinion for Application No. PCT/US15/26885, dated Sep. 16, 2015, 16 pages.
Non-Final Office Action from U.S. Appl. No. 14/481,854, dated Aug. 19, 2016, 13 pages.
Non-Final Office Action from U.S. Appl. No. 14/481,854, dated Jun. 30, 2017, 16 pages.
Non-Final Office Action from U.S. Appl. No. 14/675,708, dated Nov. 18, 2015, 5 pages.
Non-Final Office Action from U.S. Appl. No. 14/675,712, dated Nov. 19, 2015, 6 pages.
Non-Final Office Action from U.S. Appl. No. 15/376,506, dated May 31, 2017, 10 pages.
Notice of Allowance from U.S. Appl. No. 15/376,506, dated Jan. 22, 2018, 7 pages.
Notice of Allowance from U.S. Appl. No. 14/675,708, dated Jul. 29, 2016, 8 pages.
Notice of Allowance from U.S. Appl. No. 14/675,708, dated Nov. 14, 2016, 6 pages.
Notice of Allowance from U.S. Appl. No. 14/675,712, dated Mar. 2, 2018, 11 pages.
Notice of Allowance from U.S. Appl. No. 14/675,712, dated Mar. 10, 2016, 12 pages.
Notice of Allowance from U.S. Appl. No. 14/675,708, dated Mar. 16, 2016, 12 pages.
Non-Final Office Action from U.S. Appl. No. 14/481,854, dated Aug. 23, 2018, 20 pages.
Notice of Allowance from U.S. Appl. No. 14/481,854, dated Mar. 6, 2019, 16 pages.
Supplemental Notice of Allowability from U.S. Appl. No. 14/481,854, dated Apr. 17, 2019, 6 pages.
Communication pursuant to Article 94(3) EPC, EP App. No. 15783535.6, Nov. 11, 2019, 7 pages.

* cited by examiner

Video of Student Raising Hand 901

Multimedia Replay from Class 1610

PARTICIPATION QUEUE SYSTEM AND METHOD FOR ONLINE VIDEO CONFERENCING

BACKGROUND

Field of the Invention

This invention relates generally to the field of computer systems. More particularly, the invention relates to a participation queue system and method for online video conferencing.

Description of the Related Art

"Web conferencing" or "virtual conferencing" refers to various forms of online collaborative services including web seminars, webcasts, and peer-level web meetings. Web conferencing systems today support real-time audio and video streaming between participants, typically under the coordination of a central web conferencing server. Applications for web conferencing include online classrooms, meetings, training sessions, lectures, and seminars, to name a few.

On some web conferencing systems, video of the current speaker is displayed in a central (or otherwise highlighted) position within the graphical user interface. One problem with existing systems, however, it is difficult to determine who is speaking and should be prominently displayed visually at any given time, particularly in conferences that involve a large number of active speakers such as online classrooms. Providing the most prominent visual positioning to the speaker who is speaking the loudest (as is done in some existing systems) does not scale well with a large number of active speakers. In addition, selecting the loudest speaker may result in frequent transitions of the current speaker position, resulting in an undesirable end user experience. In some systems, the meeting organizer or moderator may choose who is provided with the central speaker position. However, this may result in friction to the free flow of the discussion and can be burdensome on the meeting organizer, particularly in large groups.

In addition, current web conferencing systems fail to provide adequate techniques for subdividing participants into "breakout groups" as is often done during in-person classes and training sessions. To form in-person breakout groups in a real classroom, for example, the teacher or professor may count off the number of students, divide the students into pre-arranged groups, or use some other heuristic for subdividing the class. Once the groups have been organized, the groups shuffle around the room to a designated location or move into separate classrooms to work together. The teacher or professor may then walk around to join each group and monitor progress. Once re-assembled, the groups may take turns presenting their results.

BRIEF DESCRIPTION OF THE DRAWINGS

A better understanding of the present invention can be obtained from the following detailed description in conjunction with the following drawings, in which.

DETAILED DESCRIPTION

Figure 1:
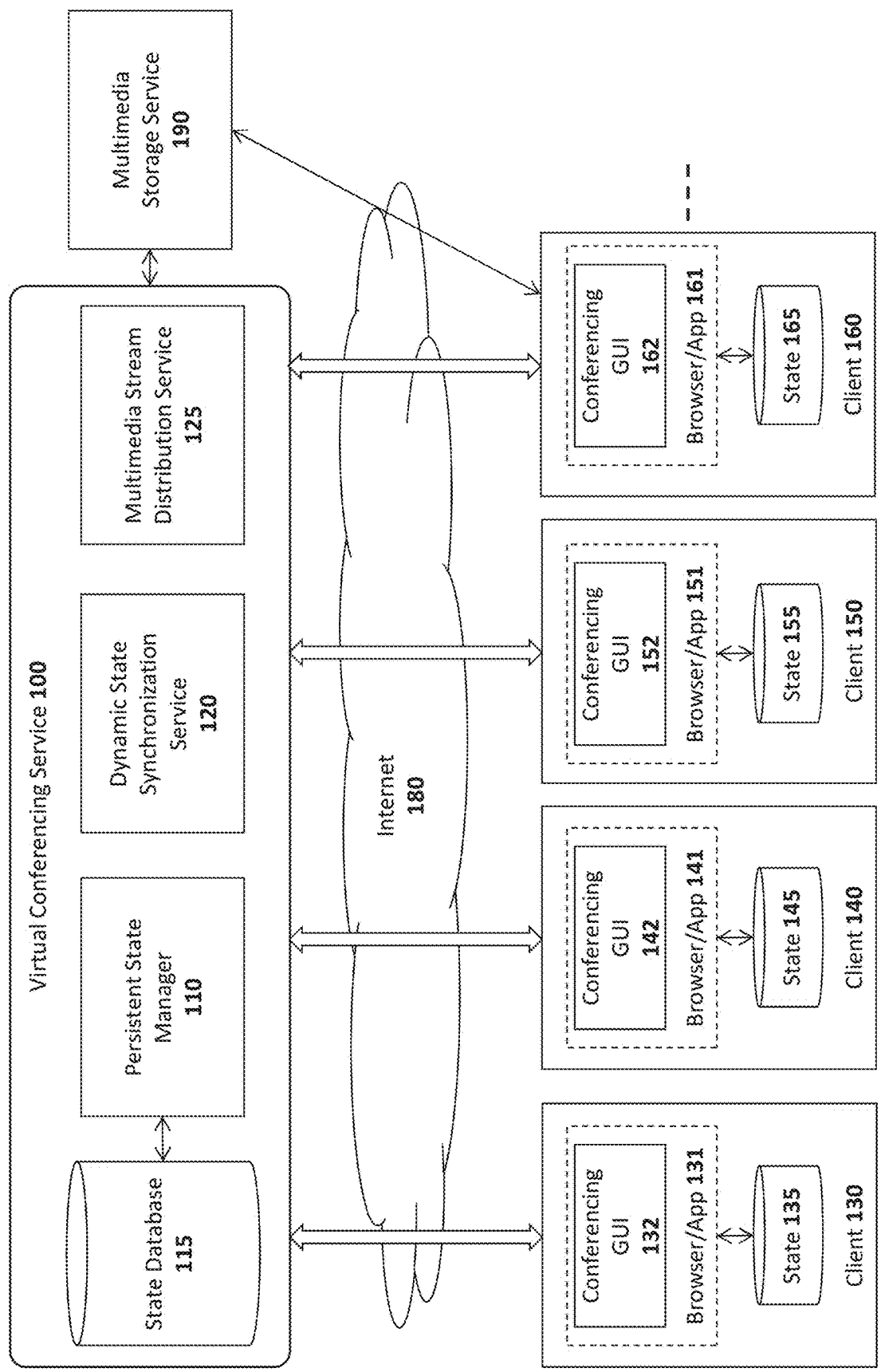
FIG. 1 illustrates an exemplary system architecture on which embodiments of the invention may be implemented.

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

One embodiment of the invention described below includes techniques for forming and managing a speaker queue, comprising an ordered set of participants scheduled to speak during the web conference. In one embodiment, participants may add themselves to the speaker queue by selecting a specified key or set of keys on the keyboard or by selecting a graphic within the graphical user interface. The speaker queue may be implemented as a first-in-first-out (FIFO) queue in which the current speaker is positioned at the first position or beginning of the queue and participants are initially placed at the last position or end of the queue (i.e., a participant moves towards the top of the speaker queue as each speaker finishes speaking and is removed from the top of the queue). In one embodiment, the professor/teacher or other moderator is designated to be the "default" speaker, and is always included in a default position in the queue (e.g., such as the bottom of the queue so that he/she reaches the top of the queue if no other participants are waiting to speak).

In addition, one embodiment of the invention includes techniques for subdividing the participants of a virtual conference into breakout groups. One embodiment of the invention automatically generates the breakout groups based on user profile information associated with each participant, previous interaction history associated with each participant, or any other data associated with participants in the virtual conferencing environment (e.g., for a group of 20 participants, 5 breakout groups of 4 participants each may be formed). One embodiment of the virtual conferencing system initially provides the professor/teacher or other moderator a set of recommended breakout groups, and then provides the moderator with the ability to edit the recommended groups (e.g., moving users between groups by clicking and dragging user icons via a graphical user interface), either before or after initiating the breakout groupings. In addition, each breakout group may be automatically provided with a set of materials (including both read-only documents and editable shared whiteboards and text editors) for working on the designated task and for storing the results generated by each breakout group. Once the breakout group session is complete, the virtual conferencing system may display the results for each breakout group, in turn, and provide each breakout group the opportunity to present the results (e.g., displaying the edited materials).

A. Architectural Overview

FIG. 1 illustrates a high level system architecture employed in one embodiment of the invention. In the illustrated embodiment, a plurality of clients 130, 140, 150, and 160 connect to a virtual conferencing service 100 over the Internet 180. The clients may comprise any form of end user devices including desktop/laptop computers (e.g., PCs or Macs), smartphones (e.g., iPhones, Android phones, etc), tablets (e.g., iPads, Galaxy Tablets, etc), and/or wearable devices (e.g., smartwatches such as the iWatch or Samsung Gear watch). Of course, the underlying principles of the invention are not limited to any particular form of user device.

In one embodiment, each of the client devices connect to the virtual conferencing service 100 through a browser or conferencing app/application 131, 141, 151, 161 which includes a graphical user interface 132, 142, 152, 162 to allow the end user to interact with the virtual conferencing service and participate in a virtual conference using the techniques described herein. In addition, each browser/app 131, 141, 151, 161 operates in accordance with a current state 135, 145, 155, 165 of the virtual conference which is synchronized between the clients 130, 140, 150, 160 using the synchronization techniques described below. By way of example, and not limitation, the current state 135 for client 130 may indicate positioning of the various graphical elements within the GUI 132, including the central position of the current speaker, a visual indication of the speaker queue, and a graphical representation and/or video images of participants in each breakout group.

In the illustrated embodiment, the virtual conferencing service 100 includes a persistent state manager 110 for persistently storing updates to the state of each virtual conference within a state database 115. As described in detail below, the state may be continually updated in response to user input provided via the browsers/apps 131, 141, 151, 161 running on the various clients 130, 140, 150, 160. In one embodiment, when a new participant joins the conference, the persistent state manager 110 provides the client with stored virtual conference state data required to synchronize the new client state with the state of the other clients participating in the conference. The persistent state manager 110 may be implemented with a Web server. However, the underlying principles of the invention are not limited to this implementation.

In one embodiment, after the client's state has been initialized from the virtual conference state database 115, a dynamic state synchronization service 120 provides dynamic state updates to the client in accordance with user input from all of the clients 130, 140, 150, 160 during the virtual conference. For example, one embodiment of the dynamic state synchronization service 120 implements a publish/subscribe mechanism in which each client publishes its own state updates to the dynamic state synchronization service 120. A client participating in the virtual conference subscribes to the dynamic state synchronization service 120 to receive the published state updates from all other clients (including itself). Thus, for a virtual conference in which Clients A-D are participants, if Client A publishes a state update (e.g., adding its user to the speaker queue), the dynamic state synchronization service 120 will forward the update to all subscribing clients (i.e., Clients A-D). This publish/subscribe mechanism is described in greater detail below. In addition, as discussed below, ordering techniques are employed in one embodiment to ensure that the state updates are applied to each client in the correct order (i.e., to ensure that the clients all remain in the same state).

In one embodiment, a multimedia stream distribution service 125 manages the receipt and distribution of audio and video streams for each of the clients 130, 140, 150, 160. In particular, in one embodiment, each client 130, 140, 150, 160 captures audio and/or video of its participant and streams the audio/video to the multimedia stream distribution service 125, which forwards the audio/video streams to each of the clients 130, 140, 150, 160. The audio is then decoded and output from speakers (not shown) and the video is decoded and rendered within each of the conferencing GUIs 132, 142, 152, 162 (examples provided below).

One embodiment of the multimedia stream distribution service 125 also implements a publish/subscribe mechanism in which each client subscribes to the audio/video streams from every other client. Thus, in the example shown in FIG. 1, Client 130 may subscribe to the audio/video streams of clients 140, 150, and 160. The particular resolution and/or frame rate of each video stream captured on each client may be dependent on the current state 135, 145, 155, 165 of the video conference. For example, when a participant is designated as the current speaker and is provided with the central speaking position within the GUI, that participant's client may capture video having a relatively higher resolution and/or frame rate than when the participant is not the speaker (i.e., and the video of the user is rendered within a small thumbnail region of the GUI). Choosing higher quality video for only the current speaker (or current set of speakers if multiple speakers are permitted) significantly reduces the bandwidth requirements of the system.

In one embodiment, a multimedia storage service 190 records audio/video content from the virtual conference and other related data to allow the moderator and/or participants to play back and review the virtual conference at a later time. For example, in a classroom environment, a professor or teacher may play back portions of the conference to review discussions among participants or questions which were posed during the conference. The professor or teacher may then provide feedback to the participants (e.g., clarifying and issue which was discussed, answering additional questions, providing positive reinforcement, etc).

The video and audio content stored on the multimedia storage service 190 may be a higher quality than the audio/video used during the live virtual conference. For example, each individual client may capture higher quality video and audio than may be possible to stream through the multimedia stream distribution service 130. The higher quality audio/video may be stored locally on each individual client 130, 140, 150, 160 during the virtual conference and may be uploaded to the multimedia storage service 190 following the conference. For example, each time a participant speaks, a local audio clip of the user's voice (e.g., an MP3 or AAC clip) may be recorded and subsequently uploaded to the multimedia storage service 190. Additionally, state data 135, 145, 155, 165 and/or other data required to reconstruct the virtual conference for playback may be stored on the multimedia storage service 190 (as described in greater detail below).

The multimedia storage service 190 may be an external service from which the virtual conferencing service purchases storage resources. In another embodiment, the multimedia storage service 190 is implemented as a separate module within the virtual conferencing service 100.

Additional details will now be provided for exemplary speaker queue and breakout group implementations, followed by a description of additional architectural details of the virtual conferencing service 100.

B. Speaker Queue Embodiments

In order to direct the visual attention of conference participants towards the focus of discussion in a multi-party conversation in a virtual conference, signals sent by participants themselves may be relied on to indicate an intention to speak. In contrast to systems which rely solely on speaker volume, this embodiment eliminates possible errors due to poor audio conditions, poor network connections, and ambiguity in speech patterns. For example, the signals sent by the participants can be used instead of or along with speech detection algorithms (e.g., manual or automatic).

Figure 2:
FIG. 2 illustrates one embodiment of a graphical user interface (GUI) which includes a center or primary speaker region and a speaker queue.

During a web video conference or virtual conference, meeting participants are provided with the ability to request and gain access to the "center of attention." For example, as illustrated in FIG. 2, a participant has the center of attention if the participant is displayed in the largest video element or in a center element in the virtual conference, referred to as the "current speaker position" 203. In one embodiment, this is done by a "push-to-talk" or "trigger-to-talk" mechanism where the participant holds down a particular key on the keyboard, presses a graphical indication in the virtual conference environment, or performs any other suitable trigger action that would indicate that the participant would like to talk, herein referred to as the "queue key." The queue key may also toggle the microphone mute status if the microphone was previously muted.

By pressing the queue key, the participant places him or herself into a speaker queue which may be synchronized across all of the clients 130, 140, 150, 160 using the dynamic state synchronization service 120 as described herein. As illustrated in FIG. 2, a visual indication 201 of the participants in the speaker queue may be rendered within the GUI of each client 130, 140, 150, 160. In one embodiment, each client 130, 140, 150, 160 maintains its own synchronized copy of the speaker queue. When a particular participant is added to the speaker queue (e.g., by holding the queue key), that participant is automatically added to the local speaker queue on the participant's client, thereby altering the local state. The local state change is then synchronized to the other clients through the publish/subscribe mechanism implemented by the dynamic state synchronization service. If another participant requested entry into the speaker queue at approximately the same time, the dynamic state synchronization service 120 resolves the potential conflict using an ordering mechanism (described in greater detail below) and propagates correct state updates to all of the clients 130, 140, 150, 160.

Thus, by holding the queue key, the participant ensures a place in the speaker queue and the speaker queue is made visible to all participants in the virtual conference. In FIG. 2, the visual representation of the speaker queue 201 displays each participant in the queue through screenshots of the video stream of the participant in the virtual conference or any other suitable digital representation of the participant (e.g., a picture, avatar, etc). Video of the speaker at the front of the queue is displayed within the current speaker position 203 of the GUI. In addition, in FIG. 2, thumbnails of all other participants 202 (or a subset thereof) in the virtual conference are displayed within the GUI.

One embodiment of the system tracks how long each participant is in the speaker queue, how long each participant is given the center of attention and how much each participant has talked (e.g., based on signal processing of the participant's visual cue while the participant was given the center of attention). In one embodiment, this is accomplished by setting/resetting programmable timers on each of the clients 130, 140, 150, 160 and/or on the virtual conferencing service 100. In one embodiment, the time allocated to speak may be controlled by the professor or teacher (or other moderator).

The same queue key can also be used to control the mute status of the microphone. If the microphone was previously muted, entering into the speaker queue by holding the queue key will also un-mute the microphone allowing the audio of that participant to be heard by all participants in the virtual conference. In another embodiment, the previously muted microphone may not be un-muted automatically and, instead, the microphone's status is presented to the participant or all participants. For example, if the microphone was muted prior to pressing the same key (or providing any of the other actions), then pressing the same key presents an indication that the microphone is currently muted.

The action of the participant joining the speaker queue is communicated to all other participants via a message or indication such as a speaker queue visualization or a display of the speaker queue 201. In one embodiment, this is delivered to clients through the publish/subscribe mechanism employed by the dynamic state synchronization service 120.

In one embodiment, one of the participants or a moderator/instructor is set as a "default" speaker (e.g., the professor, leader, or designated participant or student of the participants in the virtual conference) who may be configured as being "behind" the last participant in the speaker queue. Thus, when the speaker queue is empty, the default speaker is placed in the center and may indicate which participant should be given the center of attention. The default speaker can be designated, for example, by a professor to a student allowing the student to field or answer questions after a presentation is given (e.g., by the student).

The speaker queue 201 may be implemented as a First In, First Out (FIFO) queue and may have a default speaker associated with the queue. For example, the default speaker would be placed in the last or trailer position of the speaker queue. In one embodiment, a participant is added to the speaker queue (e.g., at the end of the speaker queue visually)

by selecting a queue key and the participant is kept in the speaker queue by holding the queue key. The queue key can be a control key or any other suitable key on their keyboard and/or may be implemented as a graphical icon in the GUI (which the user selects via a mouse or a touch-pad). In one embodiment, a participant is removed from the speaker queue when he or she releases the designated queue key or deselects the graphical icon.

In one embodiment, the participant at the head of the speaker queue is given the center of attention by being visually featured in the conference. For example, the participant's visual cue is placed in a center element of the virtual conference or placed in the largest element in the virtual conference (e.g., center speaker position 203 in FIG. 2). Once the participant has been given the center of attention, the participant may be excluded/removed from the displayed speaker queue 201.

In one embodiment, the speaker queue is made visible to every participant in the virtual conference in a displayed speaker queue or queue visualization. For example, the displayed speaker queue 201 may be an array (e.g., horizontal, vertical, curved, etc.) of small photographs or visual cues of participants in the speaker queue. The displayed speaker queue can be in the bottom left-hand corner of the user interface of the virtual conferencing environment and positioned from left-to-right based on index or position of the participant in the speaker queue. Of course, the underlying principles of the invention are not limited to any particular visual representation of the speaker queue.

When the speaker queue is empty, the default speaker (e.g., in the trailer position of the speaker queue) is featured in the conference, for example, by being given the center of attention. The leader, web conference initiator, or professor can initially be the default speaker and/or can designate a default speaker. For example, the professor can designate the default speaker by selecting the designated participant's thumbnail video feed 202 or other visual cue in the list or group of visual cues (e.g., at top, bottom, or side of the virtual conference). In one embodiment, each participant's audio broadcasting is muted by default and may be unmuted in response to input from the participant (e.g., by the participant holding the queue key).

In one embodiment, when a participant presses and holds down the queue key, his or her microphone is un-muted. When the participant releases the queue key, the participant's microphone is muted again. In one embodiment, each speaker queue modification is synchronized to the clients of all participants via the publish/subscribe techniques implemented by the dynamic state synchronization service 120. In addition, data related to participation in the speaker queue may be stored by the virtual conferencing service 100 (and/or the external multimedia storage service 190) and later used to analyze participation activity (e.g., a length of time each participant was speaking).

While the embodiment in FIG. 2 illustrates a single speaker in a current speaker position 203, other embodiments may include multiple current speaker positions. For example, one embodiment of the invention includes multi-region layouts in which the center of attention is sub-divided into multiple "attention regions," allowing for the simultaneous display of more than one participant in the virtual conference. For example, FIG. 12 (discussed below) illustrates an embodiment with two attention regions for two different speakers. Another embodiment includes four attention regions arranged in a square or rectangle with two regions towards the top of the display and two regions towards the bottom of the display. Any number of attention regions may be generated while still complying with the underlying principles of the invention.

In these embodiments, a single speaker queue may be maintained for all attention regions. When a region becomes available (using the same criteria as with the single-region center of attention embodiments described herein), the first participant in the speaker queue is removed and the participant video is displayed in that attention region. In an alternate embodiment, each attention region may be assigned its own dedicated speaker queue (e.g., N speaker queues for N attention regions). This embodiment may be used, for example, to provide a dedicated attention region for each breakout group, to allow different members of the breakout group to take turns speaking within each dedicated attention region. In either of these embodiments, a "default speaker" may also be specified for each attention region.

In addition, in one embodiment, when a speaker occupies an attention region in the center of attention, the professor, leader, or designated participant can "pin" the speaker to that region (e.g., by selecting a key or graphical element within the GUI). Pinning a speaker has the same effect as if the speaker actively maintained the position by holding the push-to-talk activation key or alternative mechanism to maintain the featured position. In one embodiment, no other speaker will be moved from the speaker queue into the speaker position until the featured speaker is "unpinned" by the professor, leader, designated participant, or the featured speaker themselves.

C. Breakout Group Embodiments

In a traditional classroom environment or meeting, an instructor or meeting organizer determines how to subdivide a group (e.g., by having participants count off, dividing into pre-arranged groups or using some other heuristic). Once the groups are organized, the groups typically shuffle around the room to a designated spot to work together. The organizer may walk around to interact with each group. Once re-assembled, the groups may take turns presenting.

One embodiment of the invention provides support for the same functionality within a virtualized conferencing environment. Breakout groups can be formed by the virtual conferencing environment based on user profile information associated with each participant, previous interaction history associated with each participant or any other suitable historical data associated with each participant in the virtual conferencing environment. For example, this information includes past participation statistics associated with the participant, grades, performance in assignments, etc.

In another embodiment, the participant leading the virtual conference can also affect how the breakout groups are formed. For example, the participant can select to move participants between the formed breakout groups (e.g., using a graphical click-and-drag mechanism or other suitable actions), or indicate which participants should be in the same breakout group when the breakout groups are formed.

The participant leading the virtual conference can also determine a start and/or an end time associated with the session of formed breakout groups, for example, indicating when the breakout groups are formed and when the breakout groups are dissolved into additional breakout groups or one big group.

In one embodiment, each breakout group is provided with a copy of all associated materials and/or resources from the main group (e.g., a class) and can include any additional materials and/or resources needed to perform an assigned task or other suitable action in the virtual conference. Any participant may be provided with the ability to upload any type of material, as appropriate. Furthermore when the breakout groups are re-assembled into one big group or one or more additional breakout groups, the participant leading the virtual conference can access and feature the participants and their work (e.g., through the materials and/or additional materials).

Figure 3:
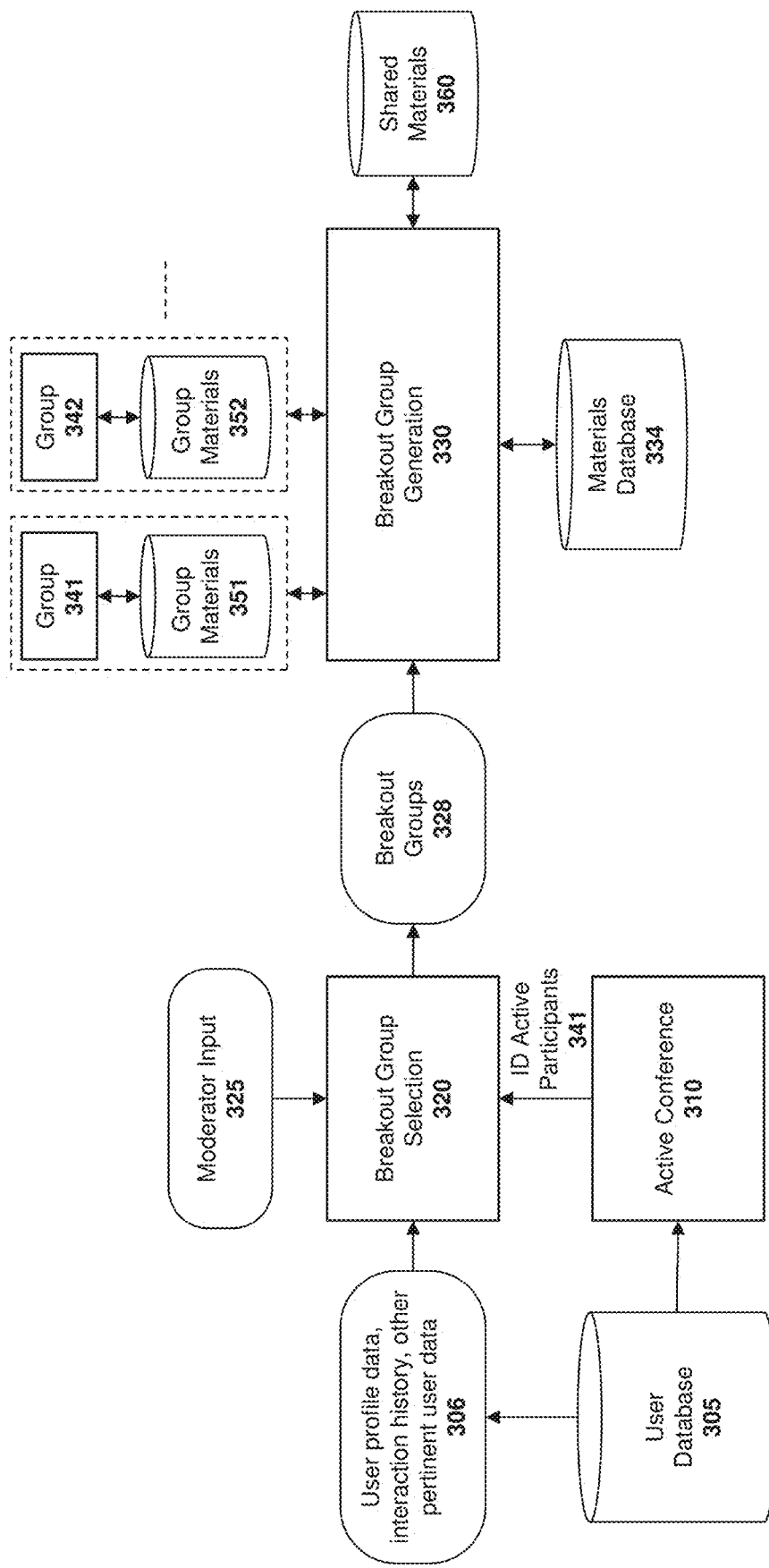
FIG. 3 illustrates one embodiment of an architecture for selecting breakout groups.

One embodiment of a logical architecture and flow for forming breakout groups is illustrated in FIG. 3. This architecture may be implemented in software modules executed within the virtual conferencing service 100, on the client machines 130, 140, 150, 160, or any combination thereof (e.g., with some operations performed on the virtual conferencing service and some on the clients).

In one embodiment, an active conference 310 is formed as participants log in and authenticate with the virtual conferencing service 100 (e.g., as participants arrive for class). A user database 305 containing user IDs and other pertinent information may be queried during the login process to uniquely identify each user. In one embodiment, a breakout group selection module 320 selects participants to be subdivided into breakout groups in accordance with input from the moderator 325 (e.g., a processor or instructor), the identity of active participants in the conference 341, and other user data 306 which may be retrieved from the user database 305 (or a different database).

By way of example, and not limitation, the moderator input 325 may indicate that the moderator wishes for there to be four breakout groups, with randomly selected participants. In response, the breakout group selection module 320 will subdivide the active participants 341 into four groups, as close in size as possible. For example, if there are 28 students, then four groups of 7 participants will be created. If there are 26 students, then two groups of 7 and two groups of 6 will be formed. Rather than randomly selecting the participants, the breakout group selection module 320 may run through the list of active participants alphabetically (e.g., using the first or last names of the participants).

Alternatively, the participants in each breakout group may be pre-assigned by moderator ahead of the class or other meeting. In this embodiment, all that is required by the breakout group selection module 320 is the list of active participants 341.

In one embodiment, the breakout group selection module 320 may select an initial set of breakout groups which the moderator may then review and modify. For example, the initial set may be selected based on user profile data or other pertinent data 306 stored in the user database 305 such as the performance of each user in the class (e.g., ensuring that each group includes at least some higher performing participants). Performance may be based on the current grade of each participant in the class, the cumulative time that each participant has talked, the grade on a recent exam, and/or additional information provided by the moderator.

The breakout group selection module 320 may consider other pertinent data to generate the initial set of breakout groups such as participant relationships (e.g., frequency of interactions among participants); specific exercise outcomes; results from a poll (e.g., automatically grouping together participants who had similar or different responses); differing responses (e.g., automatically grouping together participants who had differing responses, in order to maximize likelihood of a productive learning exchange among participants); pre-class work; and order of arrival time to virtual conference or presence in virtual conference, to name a few. In one embodiment, the moderator may also specify a maximum size for breakout groups. The breakout group selection module 320 will then form the breakout groups in accordance with this maximum size.

In one embodiment, breakout groups may be formed by an indication or a trigger from a participant or moderator (e.g., selection of a button, voice activated). The indication or trigger may be implemented within the virtual conference GUI or may be specified on a second screen or mobile device connected to the virtual conference.

In one embodiment, once a breakout group is formed, the members of the breakout group will only receive and render video and/or audio of other members of the breakout group. The video/audio of the moderator may also be shared with the members of a breakout group when visiting the breakout group. This may be accomplished, for example, by muting the audio and disabling video rendering of streams for participants in all other groups. in another embodiment, the publish/subscribe mechanism in the multimedia stream distribution service 125 is updated to that a client only subscribes to the audio/video stream of other participants in the group. Various other mechanisms may be employed to ensure that audio is contained within each breakout group.

In one embodiment, End-of-Breakout indications are generated, warning when breakout groups are about to end and/or that the breakout groups will be formed into additional breakout groups or a larger group (e.g., the original group). The indications maybe visual (e.g., via a pop-up window), audible (e.g., via an alarm or ringtone), or any combination thereof.

In addition to having the ability to "visit" breakout groups, the processor or teacher may broadcast audio/video or messages to all of the breakout groups, and may also receive messages from one or more of the breakout groups (e.g., questions posed by participants).

Returning to FIG. 3, once the breakout groups 328 have been selected (i.e., the users in each breakout group identified using the techniques described above), breakout group generation logic 330 generates an instance of each breakout group, which may include (among other things) copies of materials from a materials database 334 to be used during the breakout sessions. In FIG. 3, for example, group materials 351 and 352 are provided to breakout groups 341 and 342, respectively. In one embodiment, the group materials 351 and 352 are copies of materials from the materials database 334 which may be independently edited by each respective group, 341 and 342. In addition, the same set of shared materials 360 may also be made available and shared by each breakout group.

In one embodiment, the materials and/or resources that may be distributed to all breakout groups include (but are not limited to) YouTube videos; PDF files; PowerPoint files; URLs; document notes; picture files in different forms; sound files (e.g., MP3); links to online sites; and any other visible or audible material capable of being reviewed and/or edited during for the breakout session.

In one embodiment, each the participants in a breakout group are provided with a shared text editor and whiteboard function via a note element in the virtual conference. The shared text editor may be implemented by program code executed on each client and/or the virtual conferencing service 100. Each participant in a breakout group can also add material or documents not visible to other breakout groups. These additional external materials may be kept private to the participants of the specific breakout group (i.e., stored as group materials 351-352 in FIG. 3).

In one embodiment, each breakout group is provided with a tool to draw and annotate on top of shared or private materials or resources. The annotation tool may be provided as program code executed on each client 130, 140, 150, 160 or on the virtual conferencing service 100 (or both).

One embodiment of the invention provides for group-specific dispersion of material. For example, the professor, teacher or other form of moderator may send particular documents and other resources (e.g., homework) to specific breakout groups (e.g., based on participants in the breakout group).

As mentioned, in one embodiment, the moderator (e.g., professor or teacher) send a written-text or spoken-audio message to all breakout groups and may join a breakout group and leave the breakout group to return to a bird's-eye overview of all breakout groups. In addition, the moderator may audibly listen to all/each breakout group individually without joining each breakout group and may oversee work happening within all breakout groups. The moderator may also view the materials being edited by each of the breakout groups (e.g., shared notes as they are being typed; whiteboards, as they are being drawn, annotations as they are being added). The moderator may further respond to individual questions raised by specific breakout groups; move/drag a participant from one breakout group into another breakout group or out of the formed breakout groups completely; and cancel breakout group formation and return to additional breakout groups or one big group.

In one embodiment, a breakout group can be featured (to other participants not in the breakout group). For example, the moderator may select the breakout group (e.g., click, voice activate) resulting in the presentation of the breakout group (and all the participants in the selected breakout group) in the center of the virtual conference. In one embodiment, when a breakout group is presenting, the dynamic state synchronization service 120 will ensure that the state updates on each client cause the members of the breakout group to have the center of attention. The moderator may also minimize the presentation of other participants not in the selected breakout group. Materials associated with the selected or featured breakout group may be presented in a similar manner.

Figure 4:
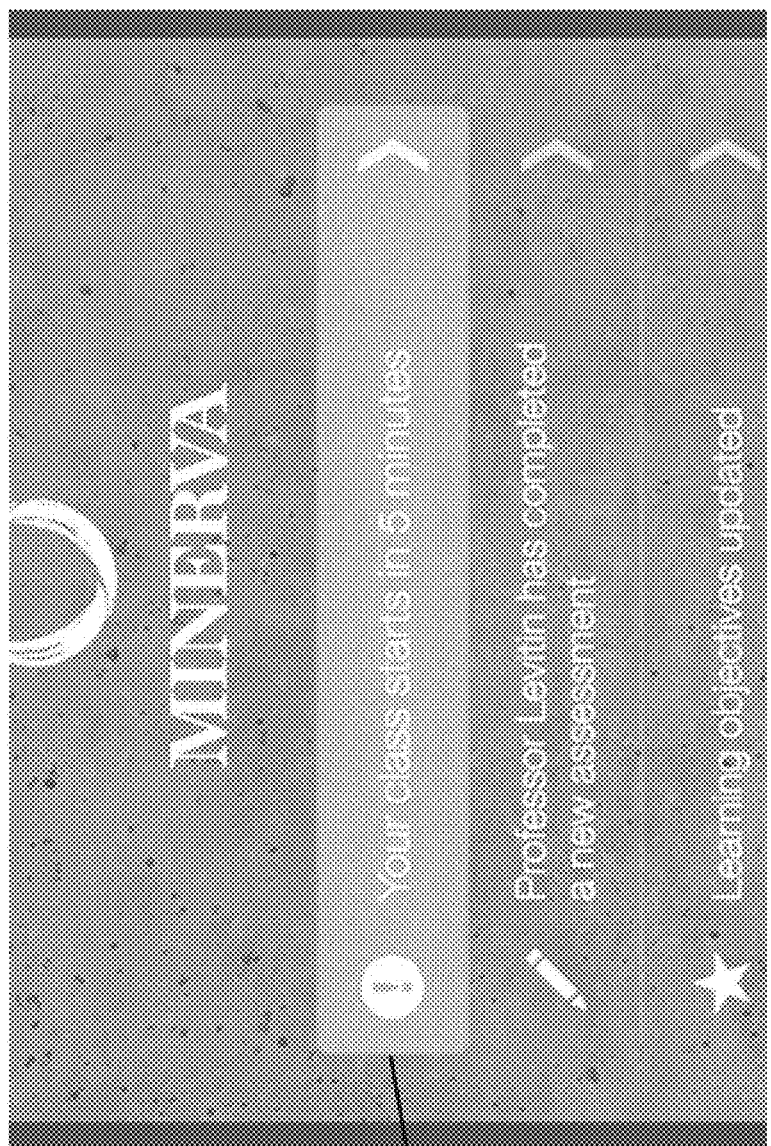
FIG. 4 illustrates a class initialization graphic for providing a participant entry into a virtual classroom.

Additional graphical user interface (GUI) features are illustrated in FIGS. 4-18. FIG. 4 illustrates an embodiment which may be displayed once a participant has logged in to the virtual conferencing service. A class initialization graphic 401 provides an indication of the amount of time before class begins (5 minutes in the example). The user may select the graphic to enter into the virtual classroom.

Figure 5:
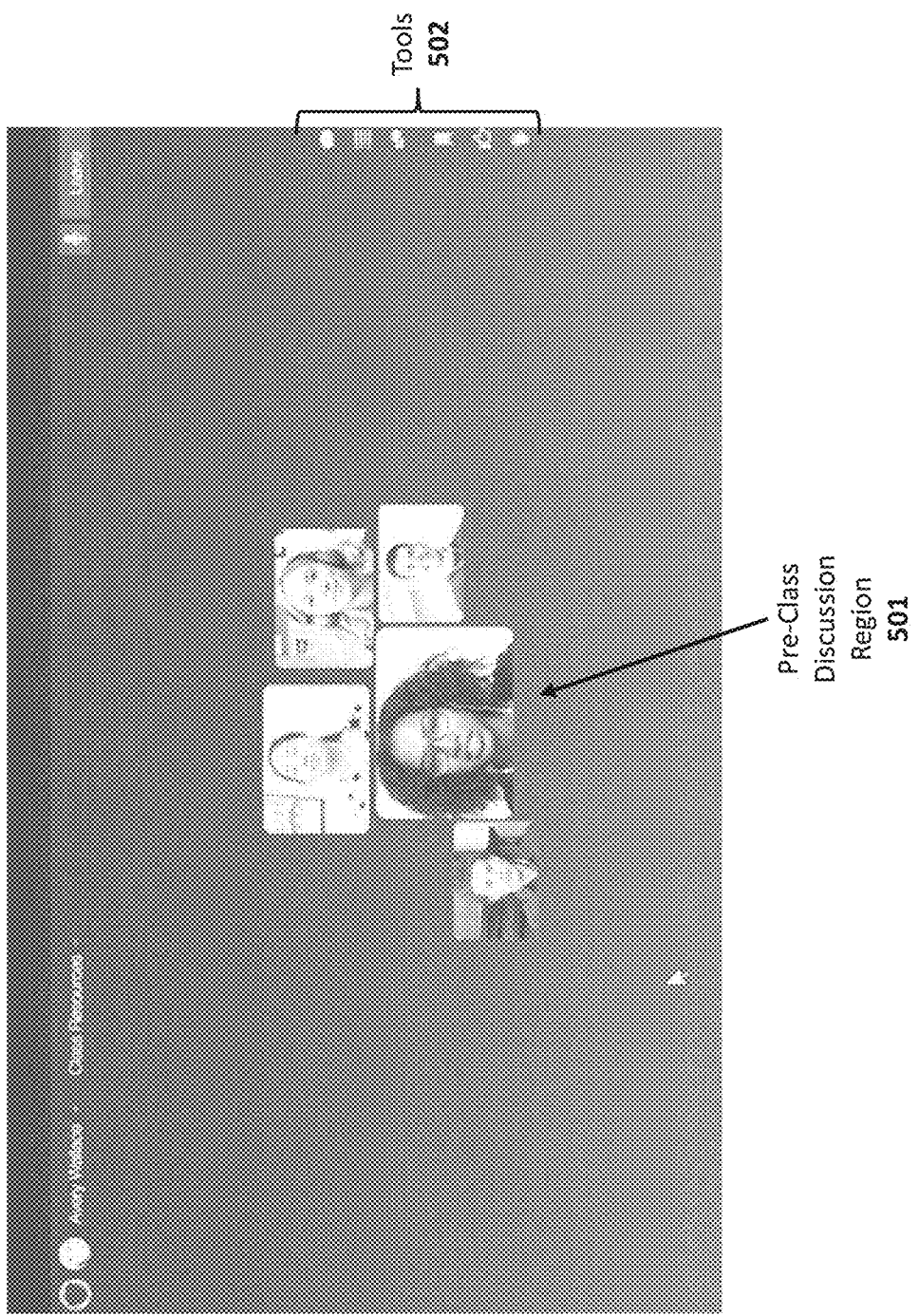
FIG. 5 illustrates an exemplary pre-class discussion region including video images of participants.

Once the participant has selected the class initialization graphic 401, the participant is taken to a pre-class user interface such as shown in FIG. 5. In this embodiment, video thumbnails of other participants who have logged in to the classroom are displayed within a pre-class discussion region 501. A set of tools 502 are also provided to allow users to text one another, open personal video chat sessions, etc.

Figure 6:
FIG. 6 illustrates a group of students connecting to the virtual classroom using a shared projector.

FIG. 6 illustrates multiple students sharing a single screen on a projector for the class and using separate devices (e.g., computers, tablets, etc) to interact with the virtual classroom (e.g., to speak in the center position, provide text comments and/or questions, etc).

Figure 7A:
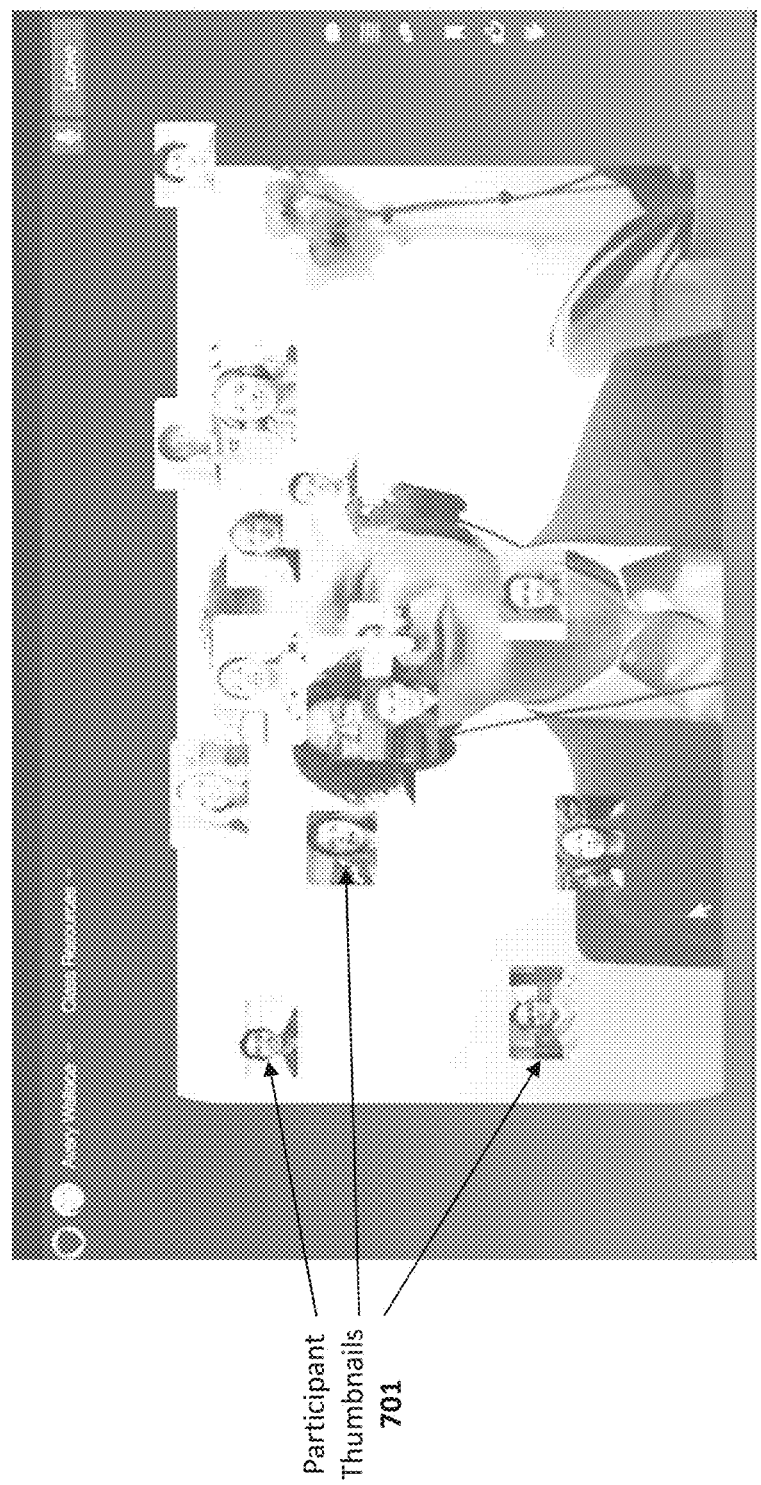
FIGS. 7A-B illustrates one embodiment of the graphical user interface as a professor or other moderator joins the virtual classroom.
Figure 7B:

FIG. 7A illustrates the graphical user interface when the professor initially joins the video conference. As illustrated, the participant thumbnails 701 are arranged randomly around the main display. In contrast, in FIG. 7B, the participant thumbnails 701 have been moved in an organized manner to the top of the display (no longer obscuring the primary speaker region). The order of the participant thumbnails 701 may be alphabetical or based on other variables such as grades or class performance.

Figure 8:
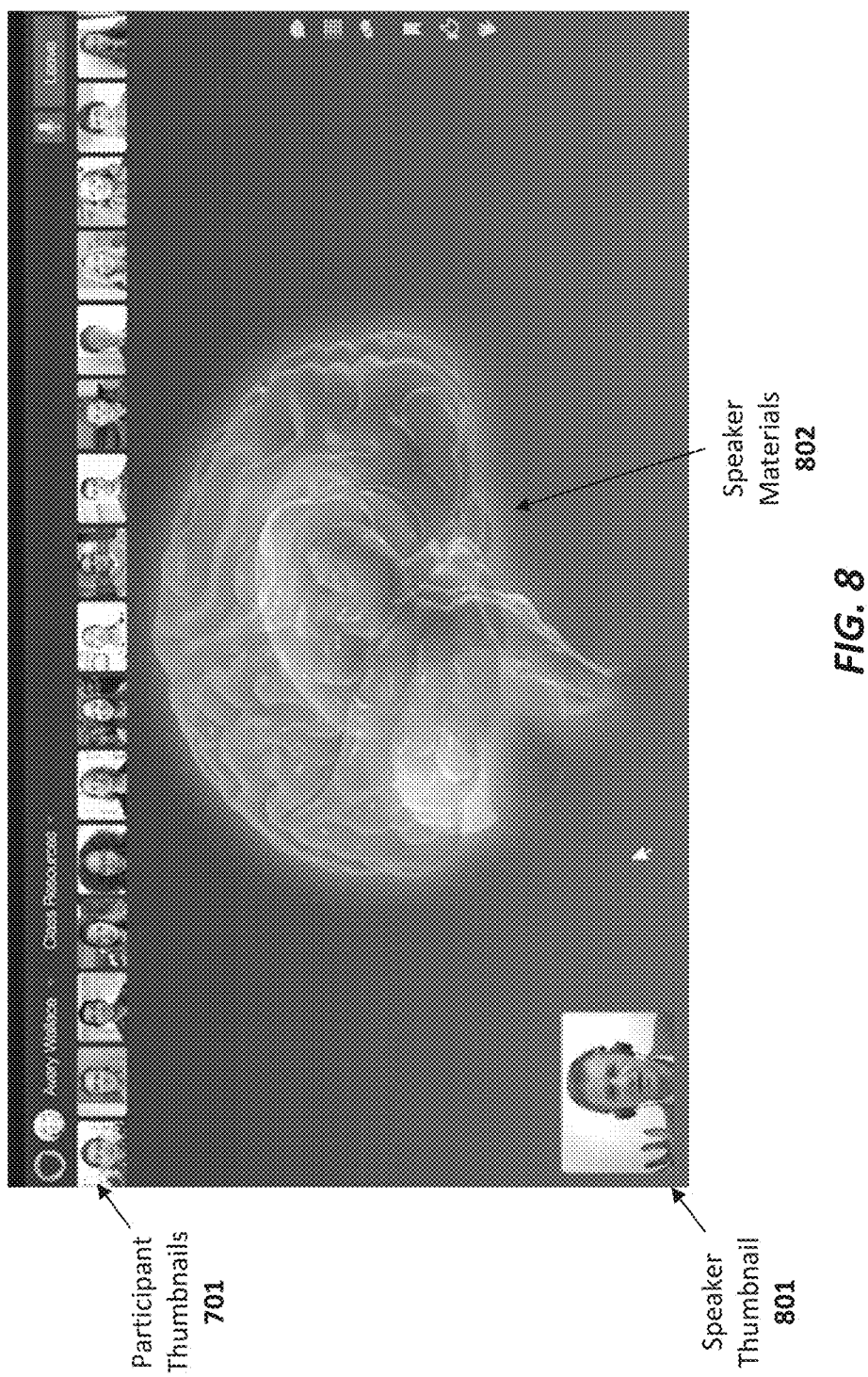
FIG. 8 illustrates a visual display of materials used by the speaker and a smaller video region for the speaker.

As mentioned, the current speaker may rely on various visual materials during the class such as a PowerPoint presentation or other graphical materials. FIG. 8 illustrates one embodiment in which the speaker is relying on materials 802 which are displayed in the center region of the display. In one embodiment, this is enabled by providing the speaker with a control button (physical or graphical) which, when selected, allows the speaker to identify materials to be displayed during the class. The video image of the speaker is offset to a thumbnail image 801 towards the bottom of the display which is differentiated from the participant thumbnails 701 based on location and size (i.e., the speaker thumbnail 801 is larger than the participant thumbnails 701).

In one embodiment, the professor uses gesture controls to manipulate the content in the speaker materials. For example, in FIG. 8, the professor is rotating his hand to cause the image of a human brain to rotate within the primary display region. Gesture controls may be implemented by capturing sensor data from a motion controller attached to the professor's computer, and using it to modify or reposition (e.g. 3-D rotate) the content. Through the publish-sub scribe mechanism, the stream of sensor data that triggered these modifications can be replicated in the view of all other clients in the class/conference.

Figure 9:
FIG. 9 illustrates a professor or teacher meeting with a student during office hours.

In one embodiment, students/participants are provided with a graphic to "raise a hand" during the class/conference. The professor or other moderator will be provided with a visual indication of a student raising a hand (e.g., via the student's thumbnail being highlighted with a hand icon or other form of highlight graphic) and may acknowledge the student by selecting the student's thumbnail. FIG. 9 illustrates a video region 901 for displaying the video feed of the student who has been acknowledged by the professor. She is brought into the main element or center element along with the professor in response to the professor's acknowledgement.

Figure 10:
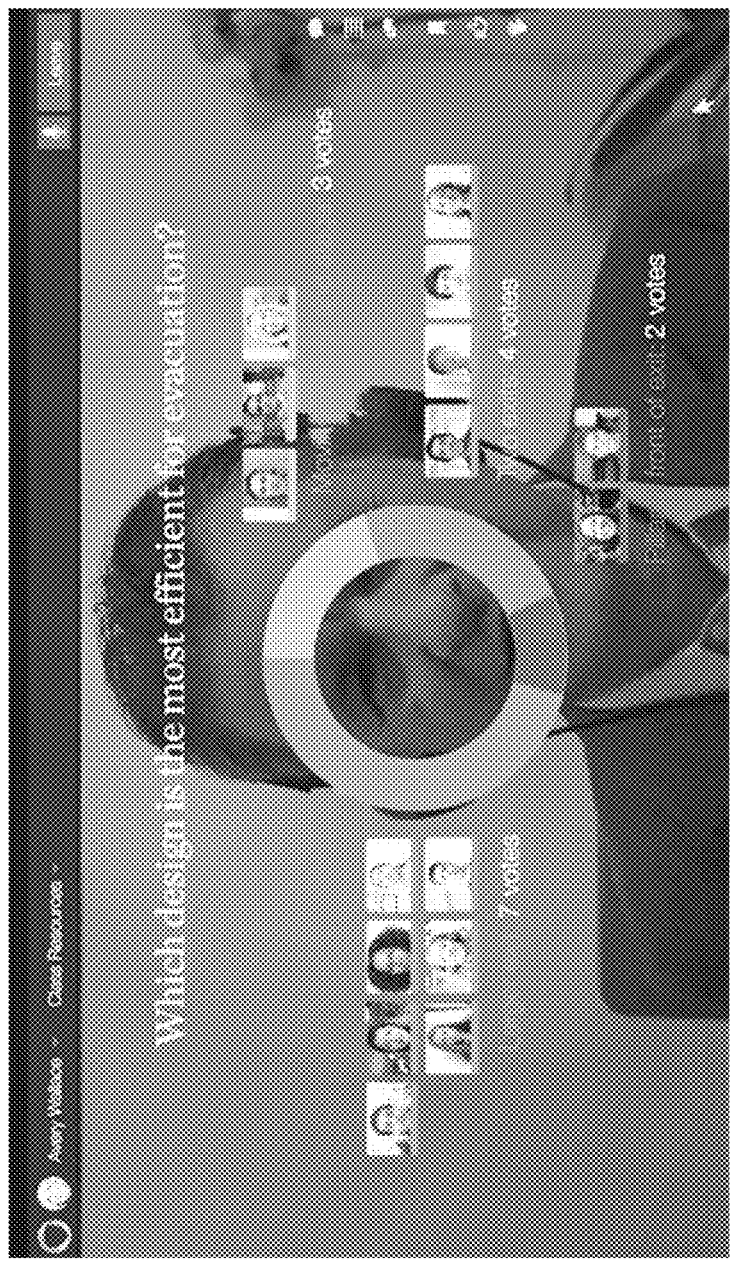
FIG. 10 illustrates visual results of a question on which participants have voted.

FIG. 10 illustrates a poll which is conducted for the purpose of forming breakout groups. That is, the breakout groups are initially determined by participants' answers to the poll. The breakout groups can include the participants who voted similarly or can be a mixed group including participants who all voted differently. In the illustrated embodiment, the participants' answers are shown but in another embodiment the answers can be anonymous.

Figure 11:
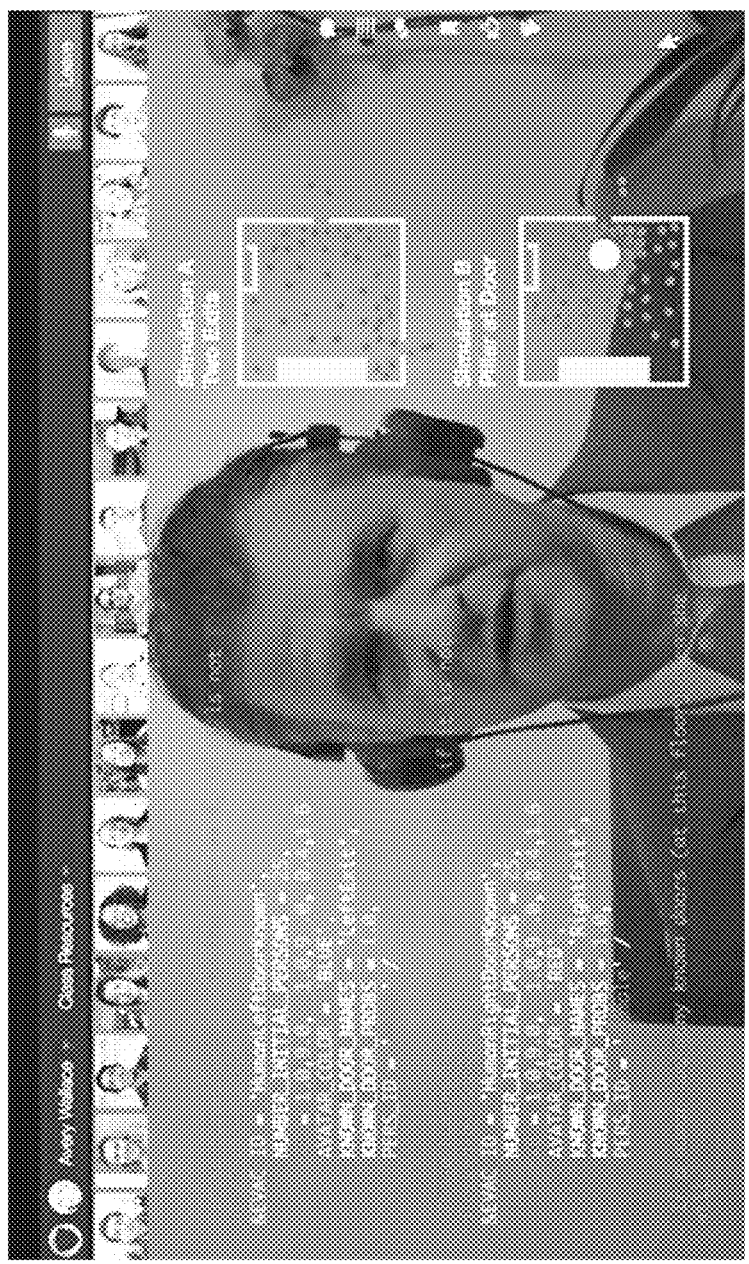
FIG. 11 illustrates one embodiment in which content is displayed on top of the primary speaker region.

FIG. 11 illustrates a GUI feature in which the professor has selected an option to overlay material over the primary speaker region in the center of the display (in contrast to the embodiment shown in FIG. 8 in which the material is displayed in the center and the video image of the professor is offset to the side). The professor may specify this option using a different control key or graphic. The overlaid material in this embodiment may also be a real-time simulation.

Figure 12:
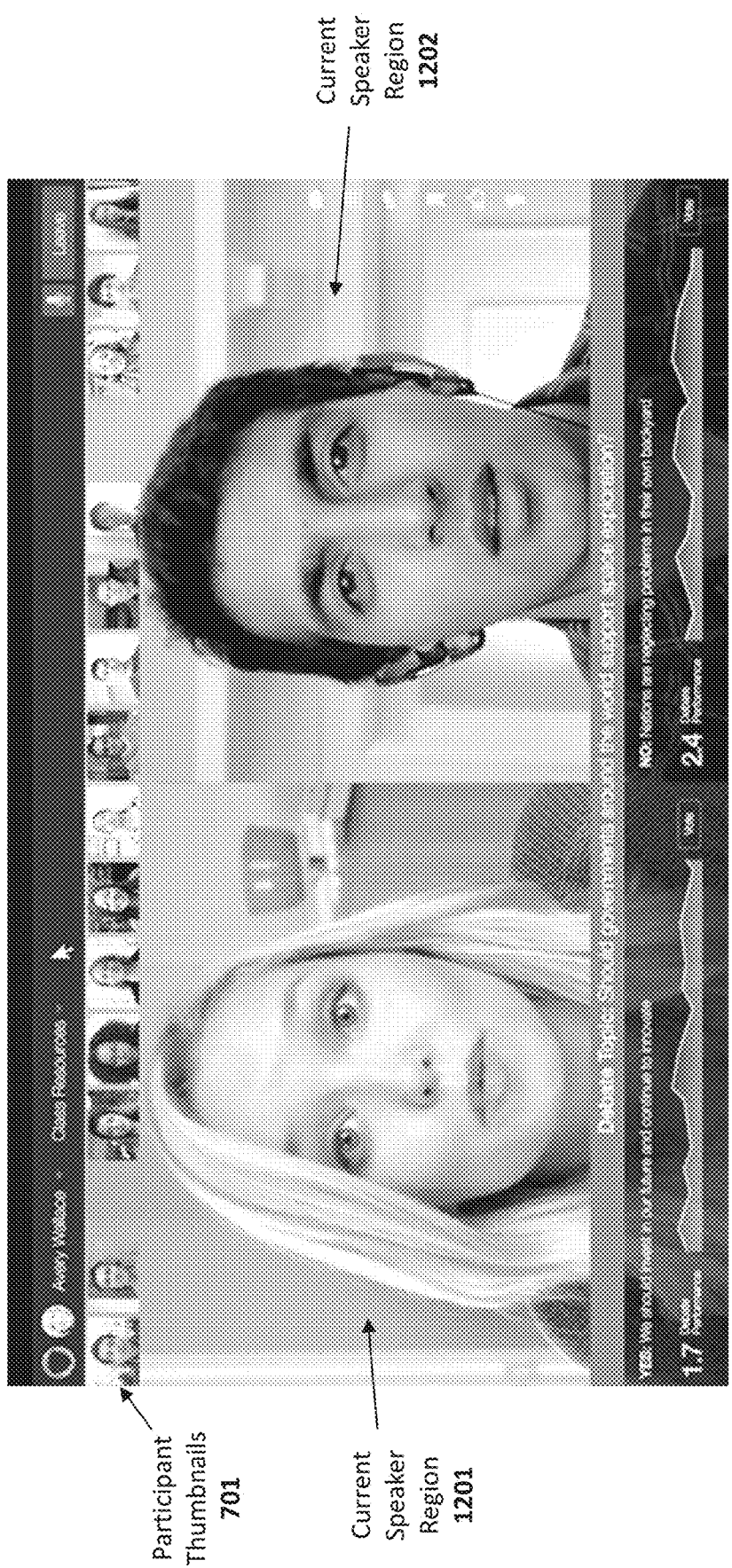
FIG. 12 illustrates one embodiment of a graphical user interface comprising two current speaker regions.

FIG. 12 illustrates an embodiment which includes two primary speaker regions 1201-1202 within the GUI. This embodiment may be used, for example, to enable debates between two or more participants or to allow two representatives of a breakout group to present results. Additional users may be added within additional speaker regions. For example, N adjacent regions may be used for N different users during a debate or during a breakout group presentation. In one embodiment, the thumbnails of the users may be removed from the participant thumbnail region 701 when the participants are shown in the current speaker regions 1201-1202.

Figure 13:
FIG. 13 illustrates one embodiment of a graphical user interface for a touch screen device.

As mentioned, in one embodiment, users are provided with the ability to view and annotate material via a touch-screen device such as a tablet device. FIG. 13 illustrates one embodiment of a tablet on which material is presented and annotations of material are made by a participant of the conference. A participant (e.g., as shown in the slightly enlarged visual cue on the top of the GUI) presents material and can annotate the material in front of the class or conference. Each participant may or may not have the ability to annotate the material. In one, the professor is provided with the ability to annotate the material and may grant access to other participants.

Figure 14:
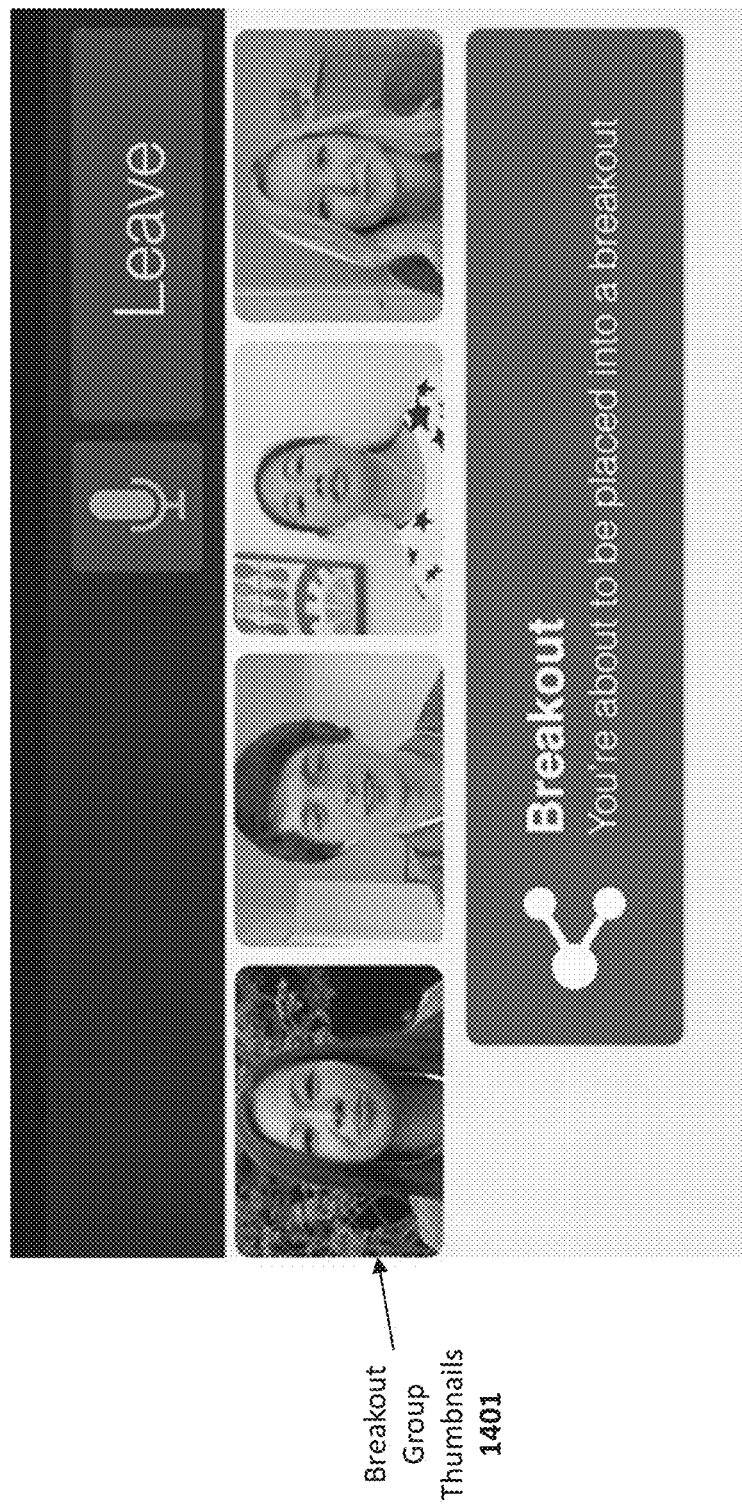
FIG. 14 illustrates one embodiment of a graphical user interface for initializing a breakout group.

FIG. 14 illustrates an exemplary message and GUI displayed to participants who are about to be placed in a breakout group. In the illustrated embodiment, the GUI includes a set of breakout group thumbnails comprising still pictures or video of the participants in the breakout group.

Figure 15A:
FIGS. 15A-B illustrate exemplary breakout group materials, annotations made to the materials, and video images of participants.
Figure 15B:
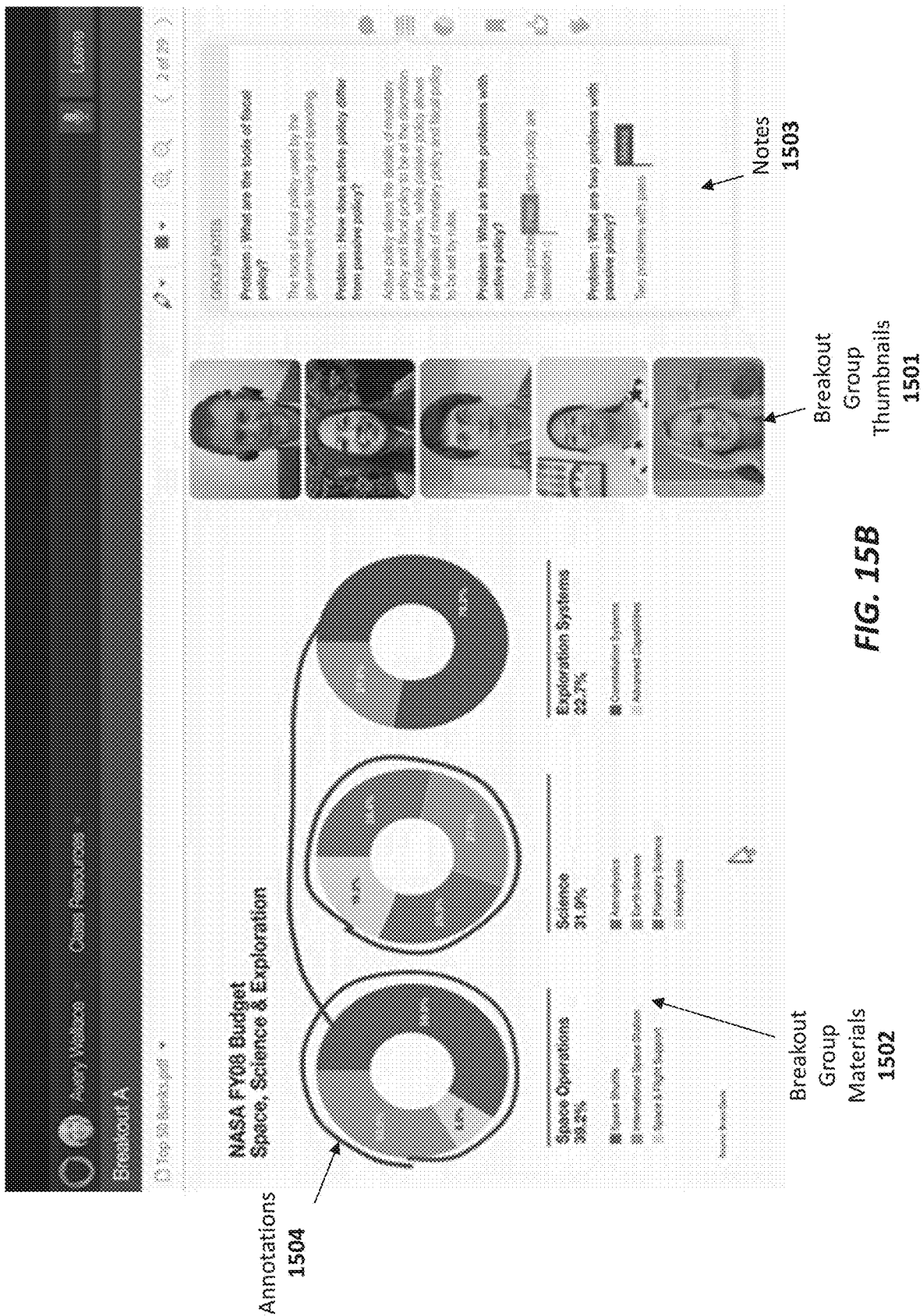

FIGS. 15A-B illustrates an exemplary set of breakout group GUI including a vertically arranged set of breakout group thumbnails 1501, breakout group materials 1502, and notes 1503 recorded by the breakout group. In addition, FIG. 15B shows how the breakout group materials 1502 may be edited with annotations 1504 (e.g., performed via a touchscreen, mouse, or other user input device).

Figure 16A:
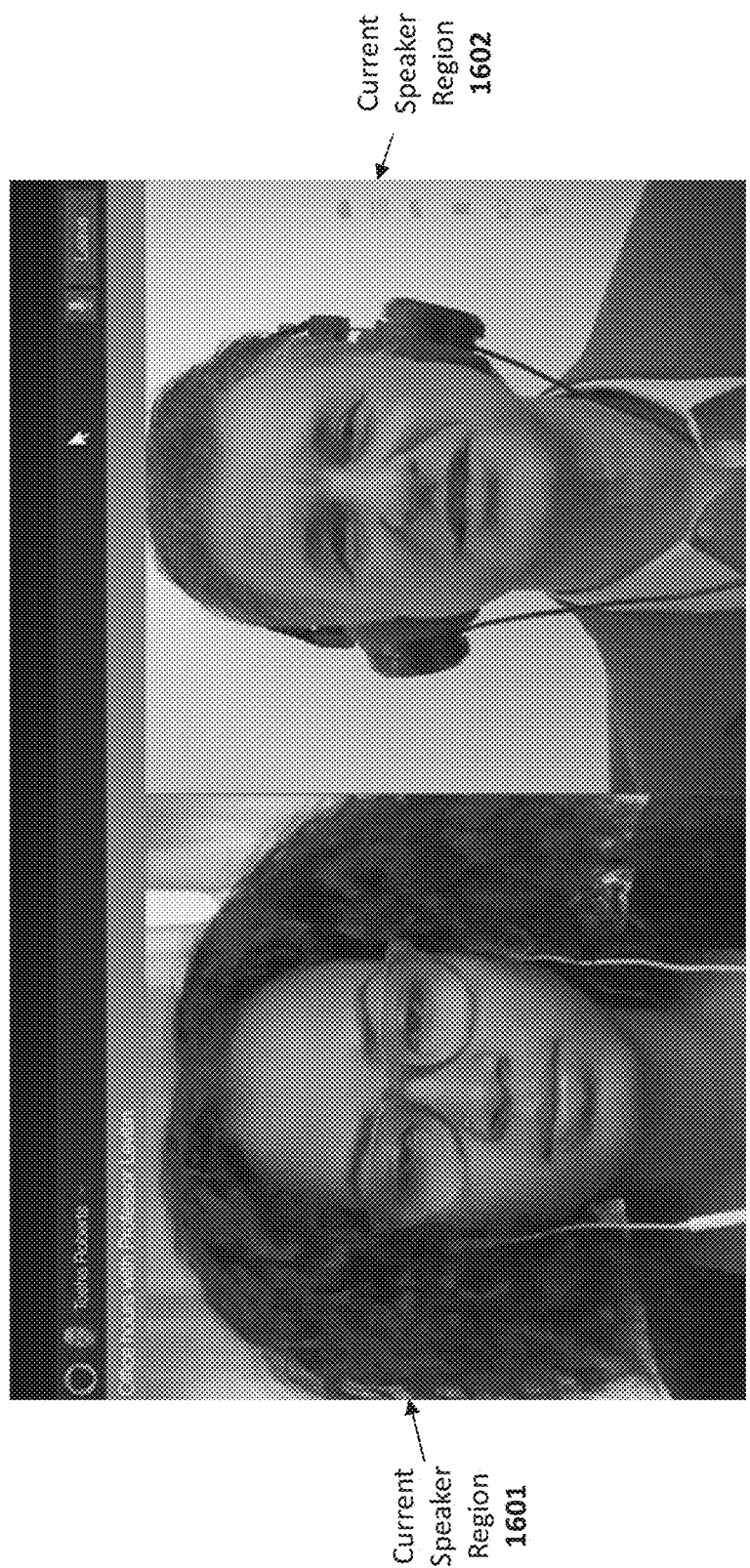
FIGS. 16A-C illustrate an exemplary graphical user interface comprising multiple speaker regions, and a region for evaluating student performance data when visiting a professor or teacher during office hours.
Figure 16B:
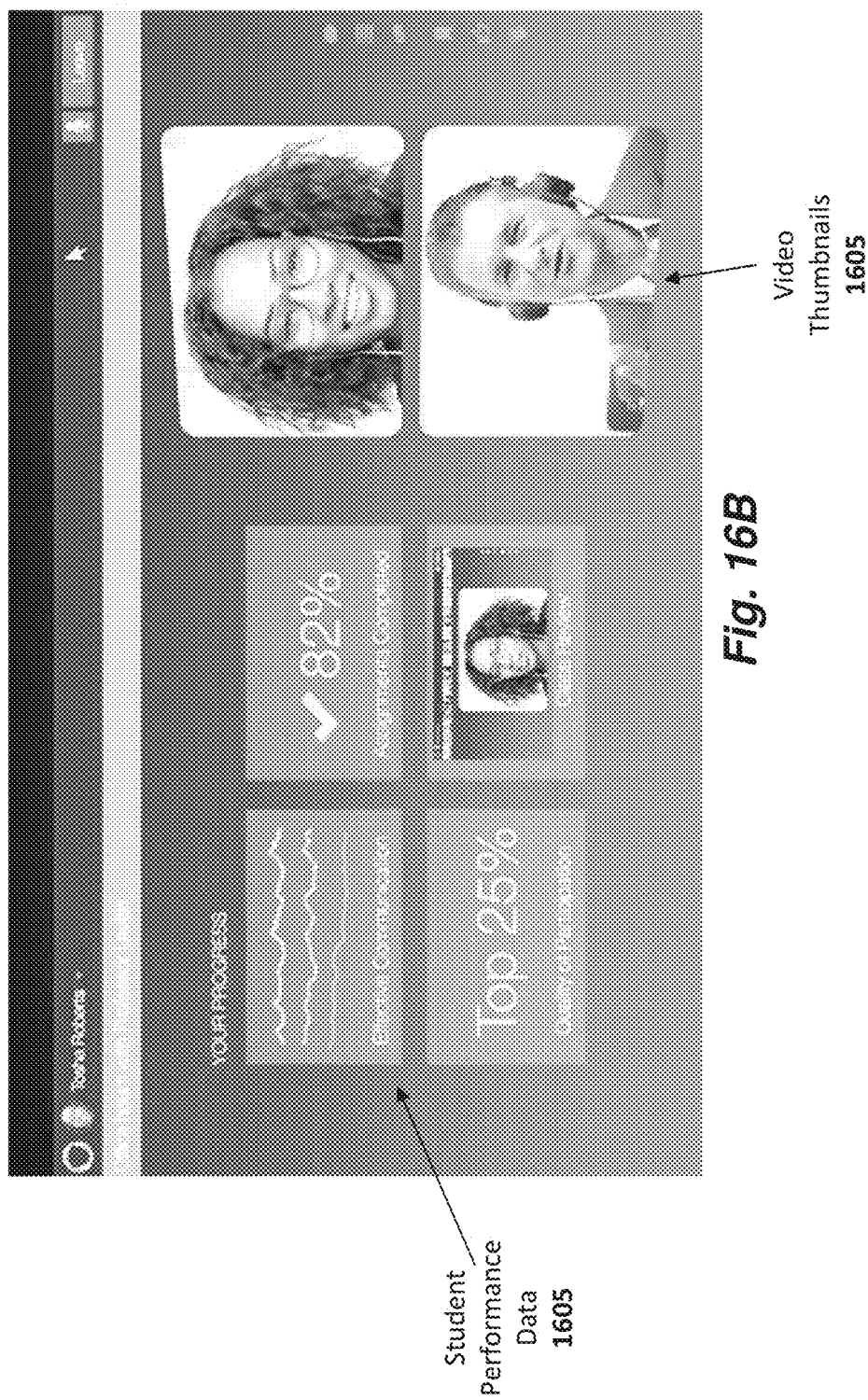
Figure 16C:

In one embodiment of the invention, the professor or teacher may be available to meet with students during office hours. FIG. 16A illustrates an exemplary embodiment in which video of a participant is displayed in current speaker region 1601 as the participant is meeting with a professor during office hours, with video of the professor displayed in current speaker region 1602. FIG. 16B illustrates an exemplary embodiment in which the student and professor review the student's performance in the class, as indicated by student performance data 1605. In this embodiment, video of the student and professor is displayed within thumbnail images 1605. As illustrated in FIG. 16C, the student and professor may review the student's participation during the class, which is replayed in region 1610. As previously discussed, the audio and/or video from the class may be stored and replayed from the external multimedia storage service 190.

D. Additional Architectural Embodiments

Figure 17:
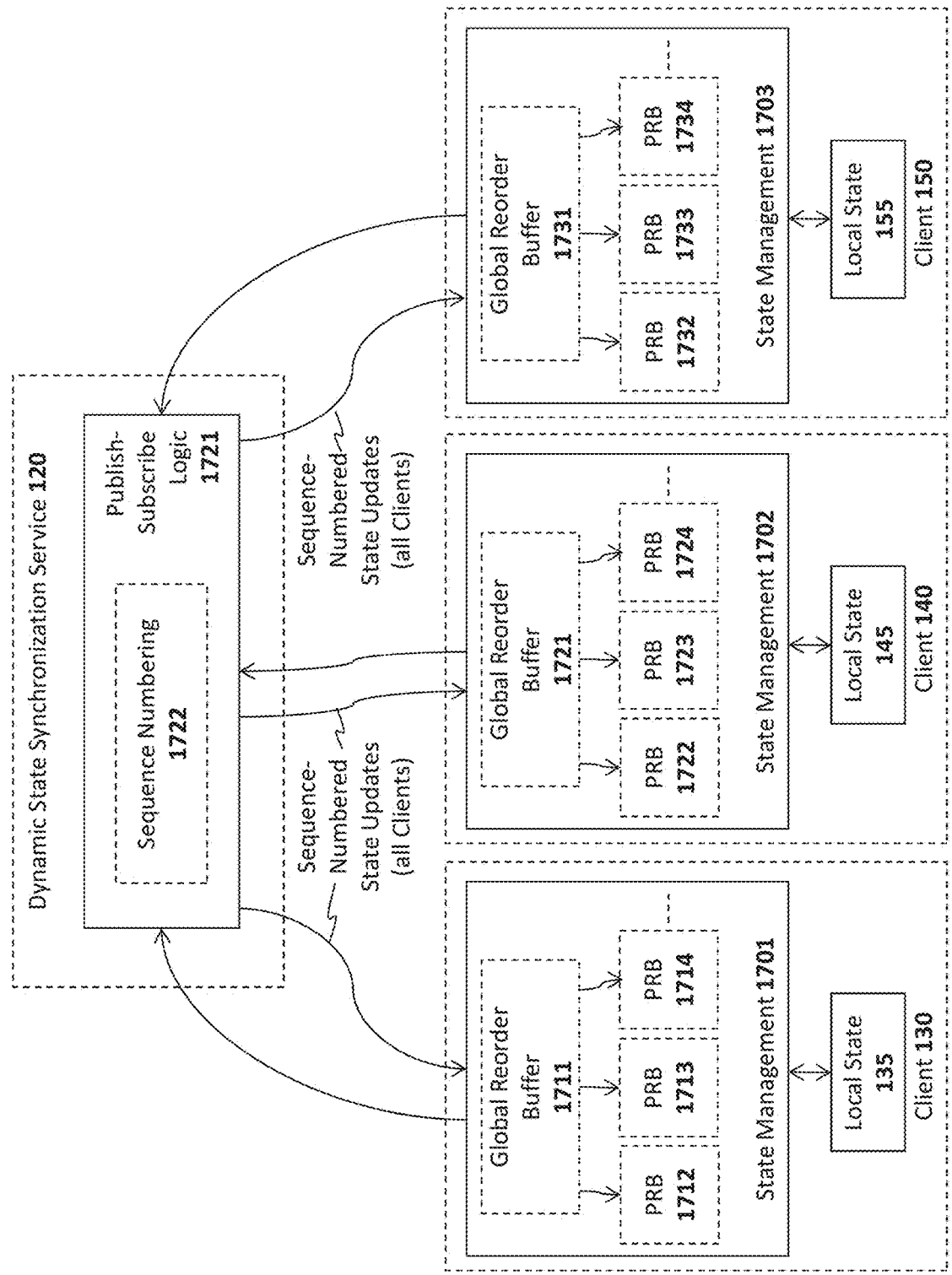
FIG. 17 illustrates an architecture for synchronizing state between clients in accordance with one embodiment of the invention.

As mentioned above, in one embodiment of the invention, the dynamic state synchronization service 120 interacts with the various clients 130, 140, 150, 160 to ensure that the state of each client is consistent (e.g., the current state of the speaker queue, the identity of the participant currently in the center speaker position, the identity of participants in each breakout group, etc). As illustrated in FIG. 17, one embodiment of the dynamic state synchronization service 120 includes publish-subscribe logic 1721 which allows each client to subscribe to receive state updates for every other client. In one embodiment, the publish-sub scribe logic 1721 maintains a publication queue for each client and every client subscribes to the publication queues of every other client (i.e., to ensure that all state updates are received by every client). Thus, when client 130 transmits a state update to its publication queue, all of the clients 130, 140, 150 which subscribe to client 130's publication queue receive the state update.

In addition, in one embodiment, sequence numbering logic 1722 ensures that state updates are applied to each client in the correct order. For example, the sequence numbering logic 1722 may increment a counter in response to the receipt of each new state update received from each client. The current counter value may then be attached to each state update to ensure that the state updates are applied in the order in which they are received by the dynamic state synchronization service 120. For example, the publish-subscribe logic 1721 may construct a packet for each state update and may embed the counter value within a field in each packet prior to transmission to each client 130, 140, 150.

In one embodiment, each client 130, 140, 150 includes state management logic 1701, 1702, 1703, respectively, which processes the state updates to maintain a consistent local state 135, 145, 155, respectively. The state management logic 1701, 1702, 1703 maintains a global reorder buffer 1711, 1721, 1731 into which all of the state updates are initially stored. Because packets may sometimes be received over the Internet out of order, the global reorder buffer is used to reorder the state updates when necessary to ensure that the state updates are applied in the same order as the counter values associated with each state update.

In addition, in one embodiment, the state management logic 1711, 1721, 1731 assigns a publisher sequence number to indicate the order of state update generated locally on its client 130, 140, 150, respectively. For example, if a participant on client 130 generates a request to be the current speaker, then sends a request to ask a question, and then removes the request to be the current speaker, the state management logic 1701 may assign a sequence number to each of these state updates to indicate the order in which they were submitted. The publisher sequence numbers are transmitted along with each state update to the publish-subscribe logic 1721 and are received by each individual client. To ensure that the state updates are applied in the same order as they were generated, the state management logic 170, 1702, 1703, maintains a set of publisher reorder buffers 1712-1714, 1722-1724, 1732-1734, respectively, which may be chained to the global reorder buffers 1711, 1721, 1731, respectively. The state management logic 1701-1703 reorders the state updates within the publisher reorder buffers 1712-1714, 1722-1724, 1732-1734 in accordance with the publisher sequence numbers to ensure that the state updates are applied in the same order in which they were generated on each client.

The end result is that the global order of state updates is maintained, based on the order in which state updates are received by the publish-subscribe logic 1721 and program order is maintained based on the sequence of operations performed on each individual client.

Figure 18:
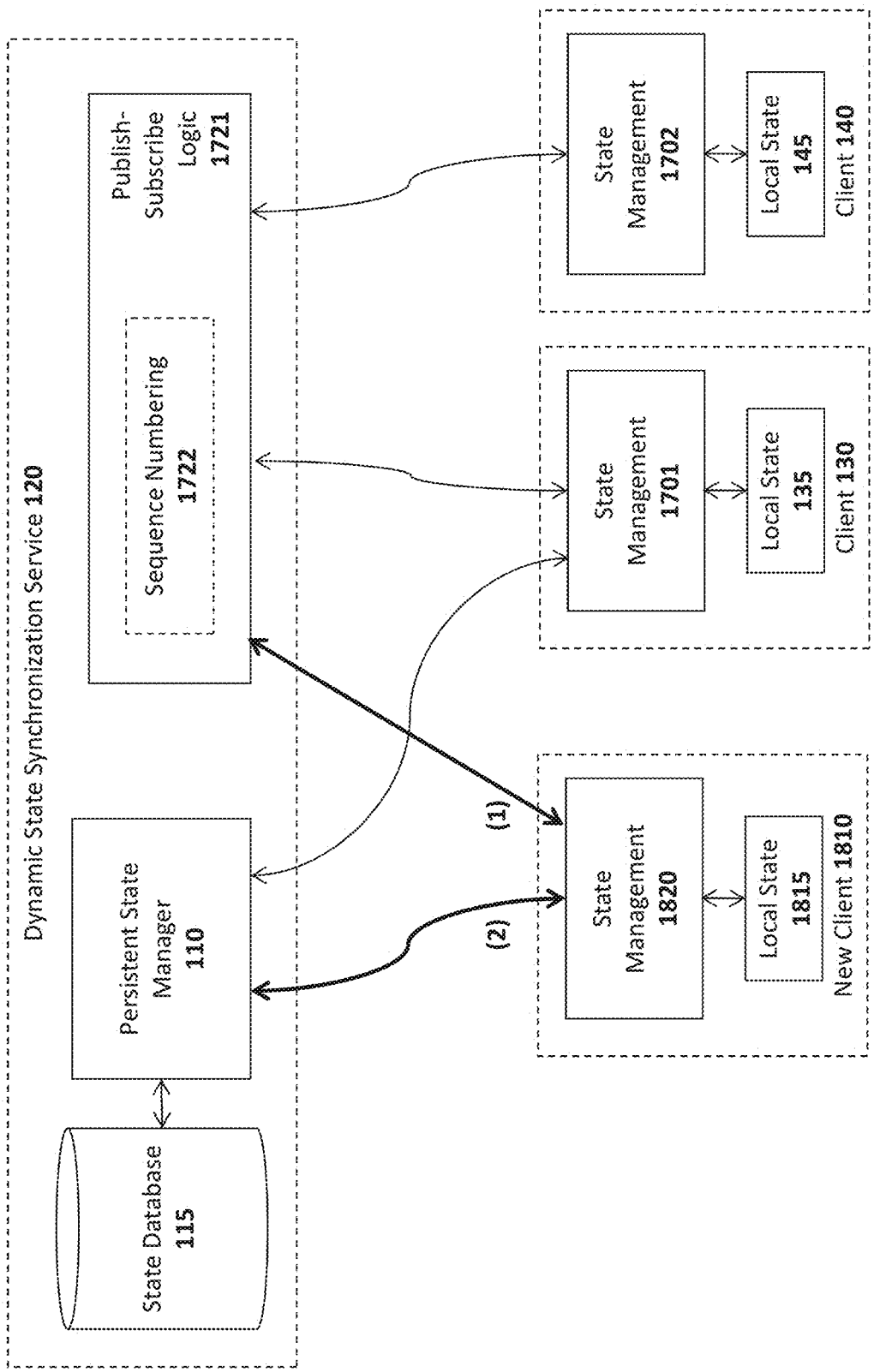
FIG. 18 illustrates additional details of the exemplary architecture for synchronizing state between clients.

Because participants may arrive to the virtual classroom (or other type of virtual conference) at different times, one embodiment of the invention includes techniques for initializing each newly-arrived client with the correct state. As illustrated in FIG. 18, this is accomplished in one embodiment with the persistent state manager 110 (briefly mentioned above) which maintains the current state of each client within a state database 115. Each time a state update is generated at a client, that client initially transmits an indication of the state update to the persistent state manager 110, which stores the state update within the state database 115. The client then connects with the publish-subscribe logic 1721 to publish the state update to the other clients. Thus, the state database 115 contains a persistent representation of the current state of all of the clients.

In one embodiment, when a new client 1810 comes online (e.g., in response to the participant joining an ongoing class), its state management logic 1820 performs the following operations to initialize its local state 1815. In one embodiment, the state management logic 1820 first establishes a connection with the publish-subscribe logic 1721, subscribing to all state updates published by all other clients and to its own state updates (as previously described). It then begins buffering all state updates received from the publish-subscribe logic 1721. In one embodiment, the state management logic 1820 then connects with the persistent state manager 110 to receive a copy of the current persistent state stored in the state database 115. Given transactional delays over the Internet, during the period of time when the initial connection is made to the persistent state manager 110 and the time when the state is downloaded from the state database 115, there may be changes made to the persistent state within the state database 115. Moreover, some state updates which the state management logic 1820 receives from the publish-subscribe logic 1721 may already be reflected in the state database 115 (i.e., because the state management logic 1820 connects first to the publish-subscribe logic 1721). Consequently, following the retrieval of the state from the state database 115 the state management logic 1820 may have a superset of all of the state data needed to initialize its local state 1815. It may include redundant state updates—some of which are reflected in the persistent state from the state database and some of which were received from the publish-subscribe logic.

To ensure that these redundancies are resolved consistently, one embodiment of the invention ensures that all state updates are idempotent. As understood by those of skill in the art, idempotence is a property of operations in computer science that can be applied multiple times without changing the result beyond the initial application. Thus, for example, if the participant on client 130 requests to be added to the speaker queue, this state update may be applied multiple times on the new client 1810 (e.g., once from the state database 115 and once from the publish-subscribe logic 1721) to achieve the same local state 1815 (i.e., the second application of the state update will not alter the final local state 1815). Thus, by ensuring that all state updates are idempotent, redundant state updates may simply be applied multiple times without affecting the underlying local state of each client.

In summary, once the state management logic 1820 has received and applied the copy of the persistent state from the state database 115 and applied all of the state updates received from the publish-subscribe logic (some of which may be redundant), the local state 1815 on the new client 1810 will be consistent with the local states 135, 145 of the other clients 130, 140.

In order to ensure a responsive user interface, one embodiment of the state management logic 1820 applies speculative state updates locally, in response to input from the local participant, and then resolves the state updates to ensure consistency upon receipt of state update responses from the publish-subscribe logic 1721. For example, in response to the participant on client 1810 selecting and holding the queue key, the state management logic 1820 may instantly place the participant in the speaker queue and/or place the participant in the center speaker region (if the participant is first in the queue). Thus, the state update will be instantly reflected in the graphical user interface of the participant, resulting in a positive user experience.

The state management logic 1820 then transmits the state update to the publish-subscribe logic 1721 where it is assigned a sequence number as described above. Because the client 1810 subscribes to its own publication queue as well as those of all other clients, the client 1810 will receive the state update from the publish-subscribe logic 1721. Upon receiving its own state update, both the global and publisher reorder buffers are applied to ensure proper ordering, and then the update is re-applied to client 1810. The second application of the state update ensures state consistency since the proper ordering is maintained. Re-applying an update is safe to do because of the idempotent property of state updates, as mentioned above.

There is the possibility of flicker in the user interface if there was an intervening, conflicting update to client 1810 between the first application of the state update and the second. That flicker will not affect state consistency, but it can cause a visual effect that is undesirable to the user. In one embodiment, some instances of flicker are eliminated by explicitly detecting conflicting state updates. To detect conflicting state updates, each incoming state update to client 1810 is checked against a queue of speculatively applied state changes to see if it will affect state that was speculatively applied. If a conflicting incoming state update is detected, client 1810 will not apply that update in one important case, specifically when client 1810 has already applied the state update as a speculative update (i.e., client 1810 published the state update) and no other conflicting state updates have been detected. This optimization eliminates flicker when, for instance, a user requests entry into the speaker queue and then quickly (in less than the round trip time to the publish-subscribe server) requests to be removed from the speaker queue.

Figure 19:
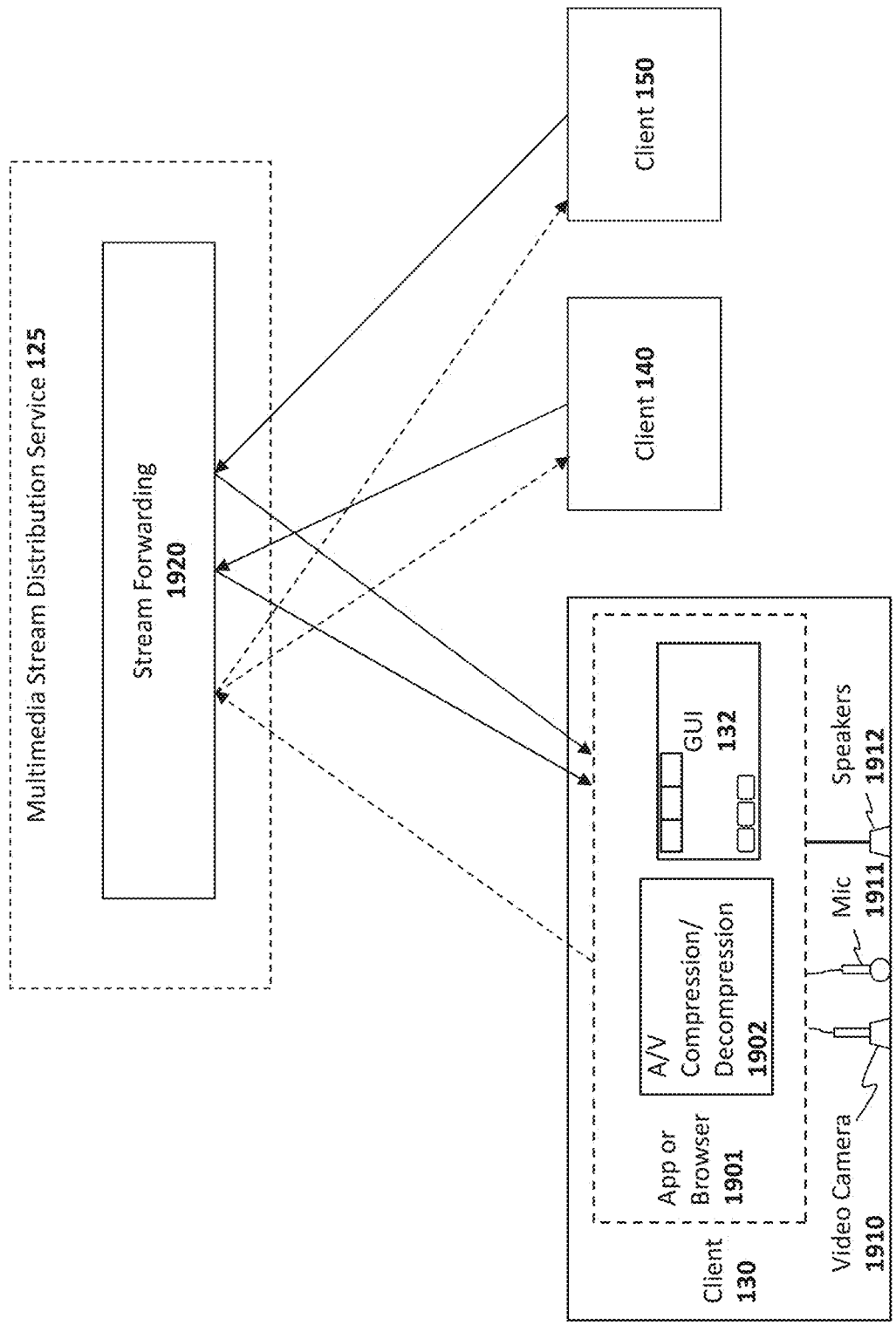
FIG. 19 illustrates one embodiment of an architecture for distributing audio and video among participants.

As illustrated in FIG. 19, in one embodiment, the multimedia stream distribution service 125 includes stream forwarding logic 1820 for managing the receipt and distribution of audio and video streams for each of the clients 130, 140, 150. In particular, in one embodiment, each client 130, 140, 150 captures audio and/or video of its participant and streams the audio/video to the stream forwarding logic 1920, which forwards the audio/video streams to each of the clients 130, 140, 150. A video camera 1910 and microphone are illustrated for capturing video and audio of the participant, respectively. Each client 130 also includes a display on which the GUI 132 is rendered and speakers 1912 for generating the audio of other participants. In one embodiment, audio/video (A/V) compression and decompression logic 1902 compresses audio and video of the participant and the compressed audio/video is then streamed to the stream forwarding logic 1920 by the virtual conferencing app or browser 1901. While the A/V compression/decompression logic is shown integrated within the app/browser in FIG. 19, this may be a logically separate module which is accessed by the app/browser.

In one embodiment, the app/browser 1901 of each client 130, 140, 150 establishes a web socket connection with the stream forwarding logic 1920 to receive streams from each of the other clients. The stream forwarding logic 1920 may distribute audio/video using a publish/subscribe mechanism where each client subscribes to the audio and video feeds of all other clients. The stream forwarding logic then forwards the incoming audio/video feeds to all subscribing clients.

Upon receiving the audio and video from other clients, the A/V decompression logic 1902 decompresses/decodes the audio and video streams, renders the video within the GUI (e.g., within the thumbnail images or within the center speaker region as described above) and outputs the decoded audio through the speakers 1912.

In one embodiment, the A/V compression/decompression logic 1902 adjusts the compression on the video of the participant depending on the size of the video image of the participant shown within the GUI. For example, if the participant is the current speaker (i.e., at the top of the speaker queue), the A/V compression/decompression logic 1902 may encode the video at a relatively higher resolution and/or frame rate, because a higher resolution is needed to provide an acceptable level of video quality for the relatively larger speaker region. In contrast, if the participant is not the current speaker, then the compression/decompression logic 1902 may encode the video at a relatively lower resolution and/or frame rate to provide an acceptable quality for displaying video within a thumbnail region. The app or browser 1901 may determine the required size of the video image (e.g., whether the user is the current speaker) by reading the local state data 135 stored on the client. In one embodiment, the app/browser 1901 may specify a desired bitrate to the A/V compression/decompression logic 1902 which will then adjust the resolution and/or frame rate accordingly. These techniques will help to keep the bitrate at a reasonable level because if there is only one speaker, for example, then only one high quality stream will be transmitted and sent to all clients. In one embodiment, when a new participant becomes the current speaker, this will be reflected in the state data of each client and the app or browser will control the A/V compression/decompression logic accordingly (i.e., to increase the resolution and frame rate of the video stream showing the new speaker).

In one embodiment of the invention, each app or browser 1901 performs dynamic bitrate adaptation based on the bitrate available to each client and the requirements of the various video regions within the GUI. For example, if 2 Mbps is available to a particular client 130, then (using FIG. 12 as an example GUI) the app/browser 1901 may specify to the A/V compression/decompression logic 1902 to allocate 1 Mbps to encode both of the current speaker regions 1201-1202 and may allocate the remaining 1 Mbps to encode all of the participant thumbnails 701. The A/V compression/decompression logic 1902 will then compress/decompress video in accordance with the allocated bitrates for each region of the GUI. In addition, in one embodiment, each participant may be provided the ability to select different quality levels to be used when encoding the participant's outgoing video stream. By way of example, these selectable levels may include high quality, low quality, and audio only (i.e., no video feed).

Figure 20:
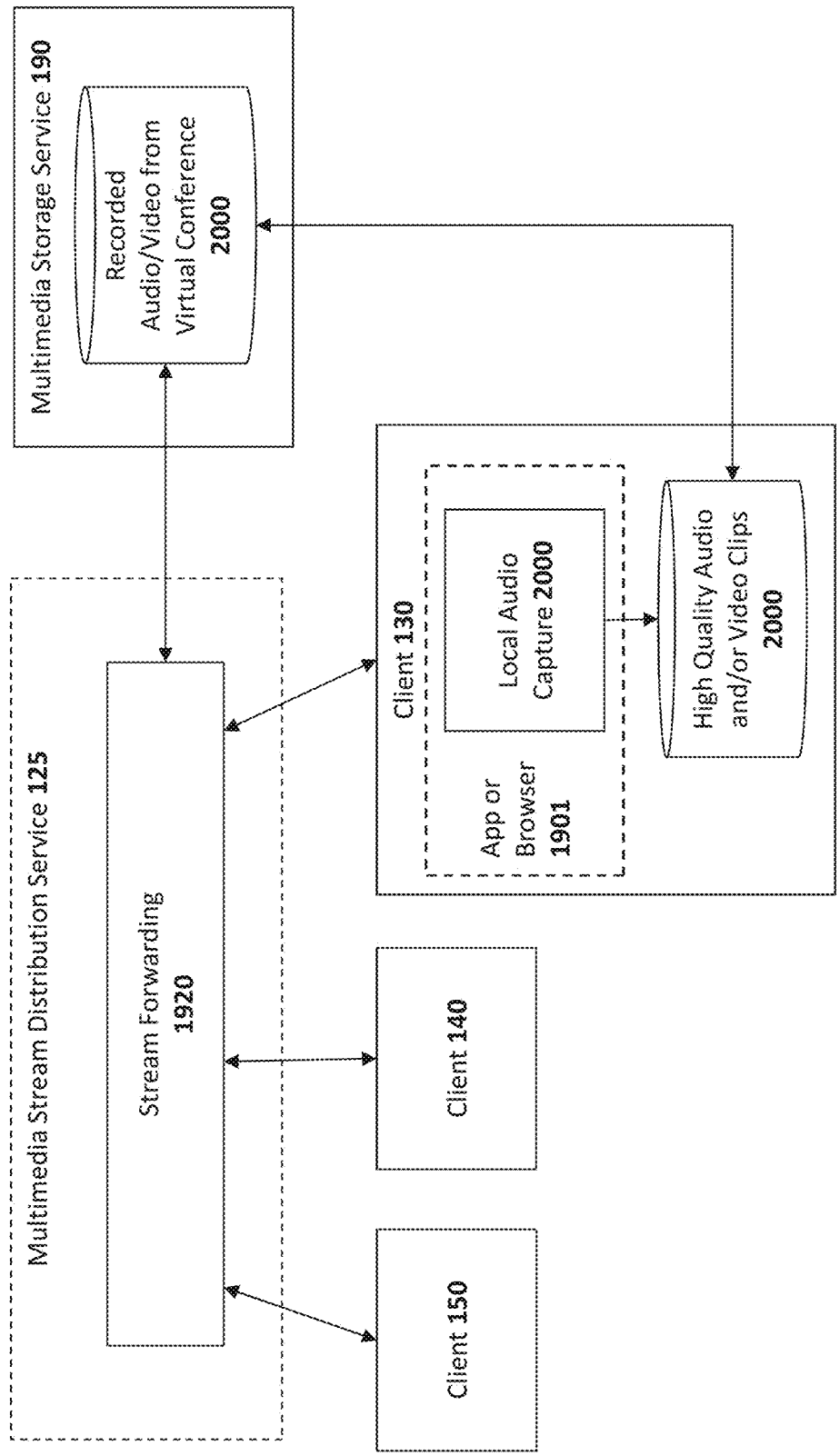
FIG. 20 illustrates one embodiment of an architecture for storing and replaying video and audio captured during a class or other virtual conference type.

As mentioned, the multimedia storage service 190 may capture and store audio and video of a class (or other virtual conference) for subsequent playback. As illustrated in FIG. 20, in one embodiment, the multimedia storage service 190 may be treated like any other client and may be configured to receive and record all audio/video streams for all participants on a storage device 2000. The data format used may comprise a plurality of audio and video clips of each of the participants. In addition, a timestamp may be associated with each audio and video clip which may be used to reconstruct the playback of the virtual class (i.e., to ensure that each audio and video clip is played back at the appropriate time).

As mentioned above, the video and audio content stored on the multimedia storage service 190 may be a higher quality than the audio/video used during the live virtual conference. For example, as illustrated in FIG. 20, local audio and/or video capture logic 2005 on each individual client may capture higher quality video and audio than may be possible to stream through the multimedia stream distribution service 130. The higher quality audio/video may be stored locally, as a set of audio and/or video clips on a storage device 2001 of each client 130 during the virtual conference. When the conference has ended, these clips may be uploaded to the storage device 2000 on the multimedia storage service 190. For example, each time a participant speaks, a local audio clip of the user's voice (e.g., an MP3 or AAC clip) may be recorded and subsequently uploaded to the multimedia storage service 190. Additionally, state data 135, 145, 155, 165, timestamp data, and/or any other data usable to reconstruct the virtual conference for playback may be collected and stored on the multimedia storage service 190 (as described in greater detail below).

In one embodiment, the recorded audio/video from the virtual conference 2000 may include audio/video and other content generated by each of the breakout groups. In this embodiment, each of the audio/video clips may be associated with an identifier identifying the breakout group from which they were collected. In this manner, the professor or teacher may individually play back the audio/video and other content to reconstruct and review the discussion and content generated by each breakout group.

In one embodiment, playback of audio, video, and other content is performed using a virtual conference playback tool. The playback tool may be implemented as a separate app or application or as a browser plug-in.

While the embodiment described above relies on a central virtual conferencing service 100 to establish connections between clients and to stream video and audio between the clients, the underlying principles of the invention are not limited to this particular implementation. For example, in one embodiment, the clients are configured to establish peer-to-peer connections with one another, either without a central server (e.g., using a peer-to-peer networking protocol), or using a central server solely as a directory server, to lookup the network addresses of the other clients participating in the virtual conference. Once connected via peer-to-peer connections, the clients may implement the same state synchronization techniques described above, including management of the speaker queue and breakout groups. In addition, in this embodiment, the clients establish direct connections with one another to exchange video and audio of the participants.

Alternatively, rather than merely forwarding video and audio streams between participants, the central virtual conferencing service 100 may compress/recompress the video and/or audio based on the capabilities of each individual client (e.g., reducing the resolution and/or frame rate for clients with smaller displays or lower-bitrate network connections). In addition, in one embodiment, the virtual conferencing service 100 may combine the video streams from each of the clients into a single video stream that is then streamed to all of the clients (e.g., compositing all of the video streams into a single video frame, which is then compressed and streamed to the clients).

In addition, various different forms of video and audio compression may be used by the clients and/or the virtual conferencing service 100 while still complying with the underlying principles of the invention. This includes, but is not limited to, H.264, VP8, and VP9 for video coding and Opus and iSAC for audio coding.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A virtual conferencing system comprising:
    a plurality of clients, each client comprising:
        one or more audio/video (A/V) capturing devices to capture audio and video of a participant at the client during the participant's participation in a virtual conference; and
        A/V compression and decompression logic to compress the captured audio and video of the participant to generate an A/V stream, wherein the A/V compression and decompression logic encodes the captured audio and video of the participant at a relatively higher resolution and/or frame rate when the participant is a current speaker;
    a virtual conferencing service to establish A/V connections between the plurality of clients during the virtual conference, the virtual conferencing service further including a multimedia stream distribution service communicatively coupled to a virtual conferencing app/browser on each client through a web socket connection, the multimedia stream distribution service comprising:
        a stream forwarding logic to manage receipt and distribution of A/V streams for each client, wherein the stream forwarding logic is to receive a first A/V stream from a first client of the plurality of clients and forwards the first A/V stream to one or more other clients of the plurality of clients;
        a multimedia storage service configured to receive and record all A/V streams for all participants on a storage device; and
        a dynamic state synchronization service of the virtual conference service to synchronize a speaker queue across the plurality of clients, wherein the speaker queue is associated with a default speaker and the default speaker is to gain access to a current speaker position in the virtual conference when the speaker queue is empty.

2. The virtual conferencing system of claim 1, wherein the one or more A/V capturing devices comprise video camera to capture video of the participant and microphone to capture audio of the participant.

3. The virtual conferencing system of claim 1, wherein each client further comprises:
    a display on which a graphic user interface (GUI) is rendered to display video from the A/V stream; and
    speakers to play audio from the A/V stream.

4. The virtual conferencing system of claim 3, wherein the A/V stream is streamed to the stream forwarding logic by the virtual conferencing app/browser of the client.

5. The virtual conferencing system of claim 4, wherein the A/V compression and decompression logic adjusts compression rate for the captured audio and video of the participant depending on a size of a video image of the participant shown within the GUI.

6. The virtual conferencing system of claim 5, wherein the A/V compression and decompression logic encodes the captured audio and video of the participant at a relatively lower resolution and/or frame rate to provide an acceptable quality for displaying video within the GUI when the participant is not the current speaker.

7. The virtual conferencing system of claim 6, wherein the size of the video image of the participant shown within the GUI is determined by the virtual conferencing app/browser by reading local state data stored on the client.

8. The virtual conferencing system of claim 7, wherein the virtual conferencing app/browser specifies a desired bitrate to the A/V compression and decompression logic, the A/V compression and decompression logic then adjusts an encoding resolution and/or frame rate accordingly.

9. The virtual conferencing system of claim 8, wherein the virtual conferencing app/browser performs dynamic bitrate adaptation based on an available bitrate to the client and requirements for each of a plurality of video regions within the GUI.

10. The virtual conferencing system of claim 1, wherein the stream forwarding logic distributes A/V stream using a publish/subscribe mechanism where each client subscribes to A/V feed of all other clients and the stream forwarding logic forwards received incoming audio/video feeds to all subscribing clients.

11. The virtual conferencing system of claim 1, wherein the multimedia storage service is configured to receive from one or more of the plurality of clients a set of audio and/or video clips of the virtual conference that are stored locally on the client.

12. A method comprising:
    establishing, by a virtual conferencing service, audio/video (A/V) connections between a plurality of clients and the virtual conferencing service, each client comprising one or more A/V capturing devices to capture audio and video of a participant at the client during the participant's participation in a virtual conference, the virtual conferencing service including a multimedia stream distribution service communicatively coupled to a virtual conferencing app/browser on each client through a web socket connection;

compressing, by a A/V compression and decompression logic of the client, the captured audio and video of the participant to generate an A/V stream, wherein the captured audio and video of the participant is encoded at a relatively higher resolution and/or frame rate when the participant is a current speaker;

receiving a first A/V stream from a first client of the plurality of clients;

forwarding the first A/V stream to one or more other clients of the plurality of clients;

receiving and recording all audio/video streams for all participants on a storage device; and synchronizing a speaker queue across the plurality of clients, wherein the speaker queue is associated with a default speaker and the default speaker is to gain access to a current speaker position in the virtual conference when the speaker queue is empty.

13. The method of claim 12, further comprising using video camera to capture video of the participant and using microphone to capture audio of the participant.

14. The method of claim 12, further comprising:

displaying video from the A/V stream in a graphic user interface (GUI) rendered in a display of the client; and playing audio from the A/V stream in one or more speakers of the client.

15. The method of claim 14, further comprising:

streaming the A/V stream to the stream forwarding logic by the virtual conferencing app/browser of the client.

16. The method of claim 15, further comprising adjusting compression rate for the captured audio and video of the participant based on a size of a video image of the participant shown within the GUI.

17. The method of claim 16, wherein the captured audio and video of the participant is encoded at a relatively lower resolution and/or frame rate to provide an acceptable quality for displaying video within the GUI when the participant is not the current speaker.

18. The method of claim 17, further comprising reading local state data stored on the client to determine the size of the video image of the participant shown within the GUI.

19. The method of claim 18, adjusting an encoding resolution and/or frame rate based on a desired bitrate specified by the virtual conferencing app/browser of the client.

20. The method of claim 19, performing dynamic bitrate adaptation based on an available bitrate to the client and requirements for each of a plurality of video regions within the GUI.

21. The method of claim 12, distributing A/V stream using a publish/subscribe mechanism, where each client subscribes to A/V feed of all other clients and the stream forwarding logic forwards received incoming audio/video feeds to all subscribing clients.

22. The method of claim 12, receiving from each of the plurality of clients a set of audio and/or video clips of the virtual conference that are stored locally on each of the clients.

* * * * *